(12) United States Patent
Akiyama et al.

(10) Patent No.: US 6,204,978 B1
(45) Date of Patent: *Mar. 20, 2001

(54) OPTICAL SYSTEM

(75) Inventors: Takeshi Akiyama; Keisuke Araki, both of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/361,966

(22) Filed: Jul. 28, 1999

(30) Foreign Application Priority Data

Jul. 29, 1998 (JP) .................................................. 10-228647

(51) Int. Cl.⁷ .............................. G02B 17/00; G02B 21/00

(52) U.S. Cl. .......................... 359/729; 359/366; 359/631

(58) Field of Search ............................ 359/362, 364–367, 359/629–631, 726–731, 855–864

(56) References Cited

U.S. PATENT DOCUMENTS

| | | | |
|---|---|---|---|
| 4,750,022 | 6/1988 | Araki ........................................ 355/46 |
| 5,909,317 | * 6/1999 | Nakaoka et al. ....................... 359/631 |
| 5,917,656 | * 6/1999 | Hayakawa et al. ................... 359/631 |
| 5,917,662 | 6/1999 | Sekita ................................... 359/729 |
| 5,986,812 | * 11/1999 | Takahashi ............................. 359/630 |

FOREIGN PATENT DOCUMENTS

| | | |
|---|---|---|
| 8-292368 | 11/1996 | (JP) . |
| 8-292371 | 11/1996 | (JP) . |
| 8-292372 | 11/1996 | (JP) . |

* cited by examiner

*Primary Examiner*—Thong Nguyen
(74) *Attorney, Agent, or Firm*—Fitzpatrick, Cella, Harper & Scinto

(57) ABSTRACT

An optical system in which rays of light from an object pass through includes a first lens unit having at least one off-axial curved surface, a second lens unit and a third lens unit having at least one off-axial curved surface in the named order and wherein chiefly the first lens unit and the third lens unit cancel aberrations created by the off-axial curved surfaces with each other so that totally good aberration correction may be effected.

7 Claims, 30 Drawing Sheets

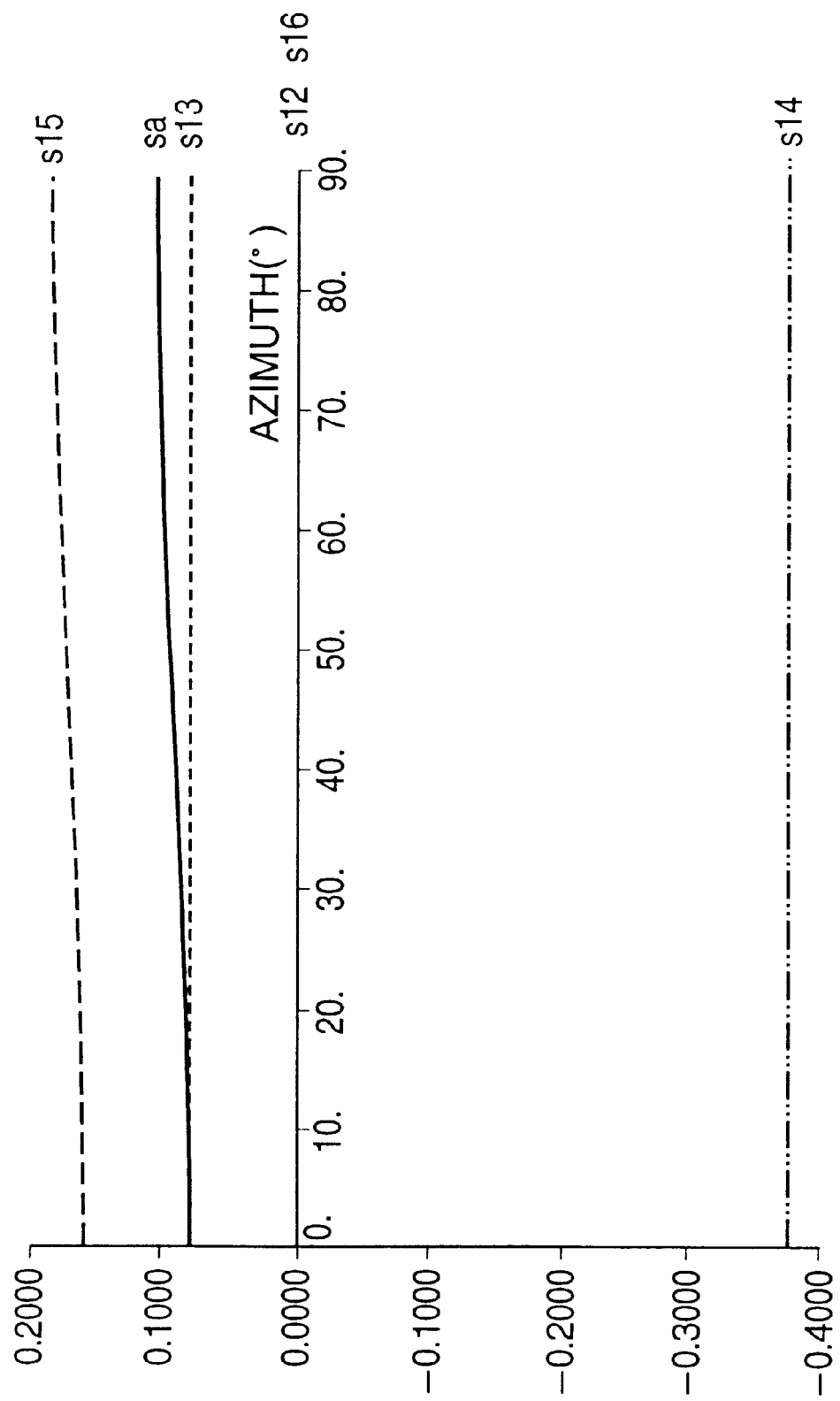

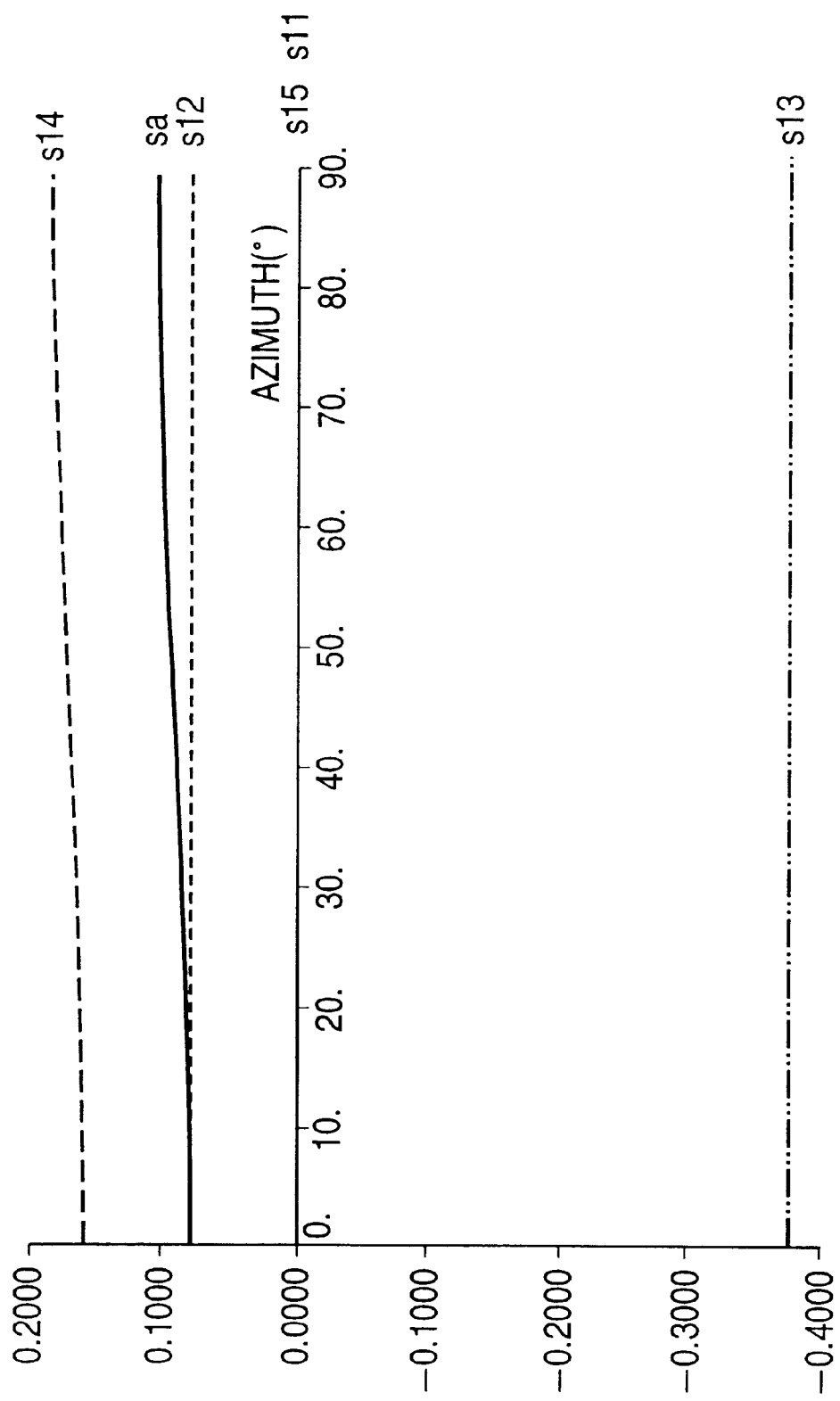

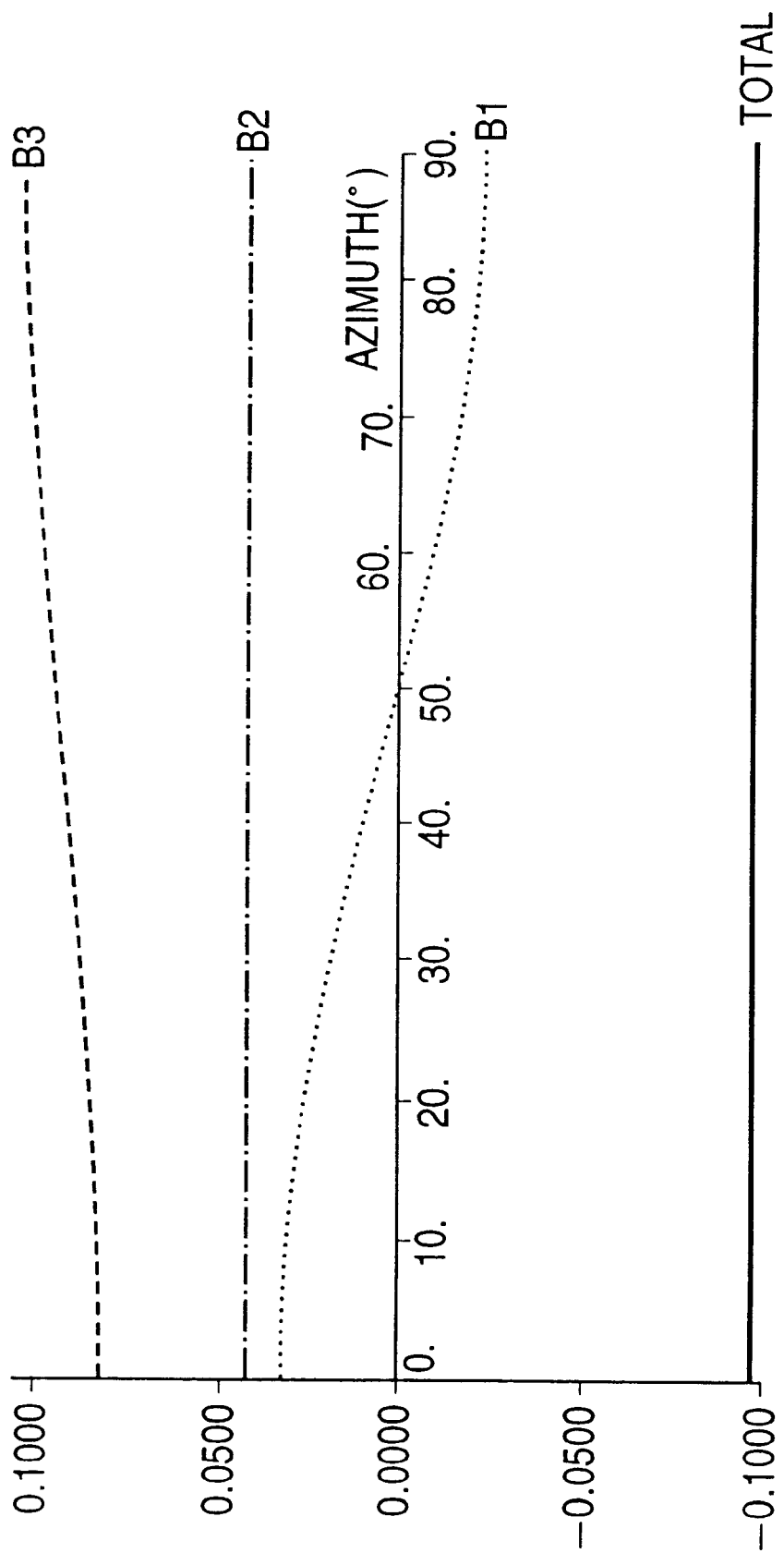

FIG. 26

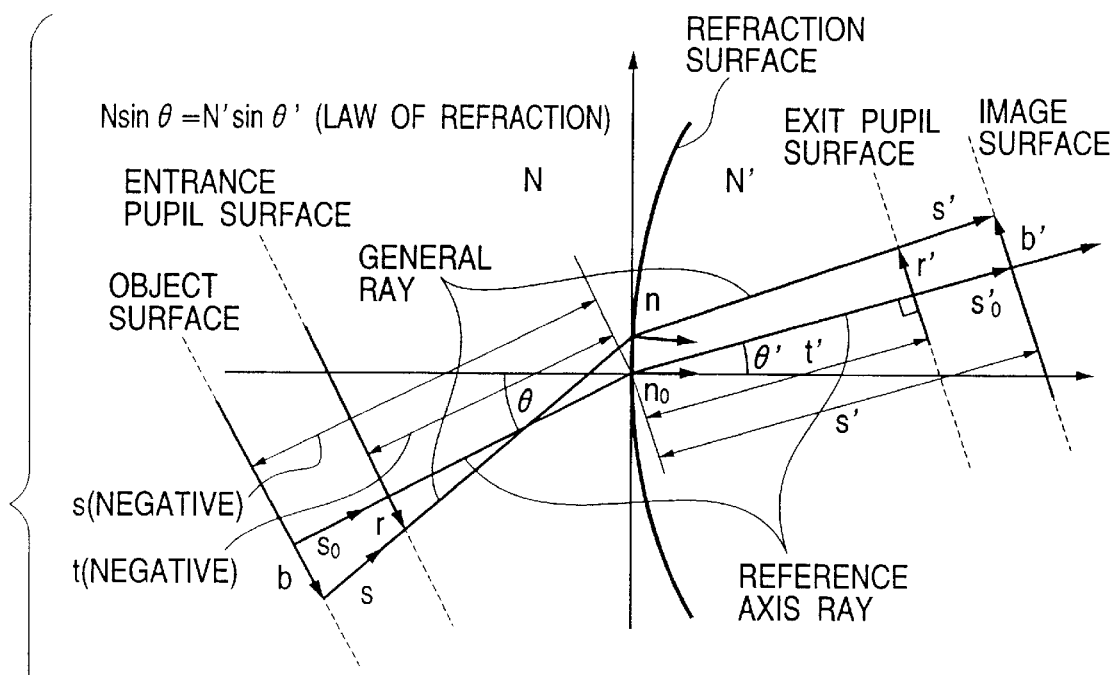

N: REFRACTIVE INDEX OF ENTRANCE SIDE
N': REFRACTIVE INDEX OF EXIT SIDE
$s_0$: UNIT VECTOR OF INCIDENT REFERENCE-AXIS RAY
$s'_0$: UNIT VECTOR OF REFRACTED REFERENCE-AXIS RAY
$n_0$: NORMAL VECTOR AT POSITION ON WHICH REFERENCE-AXIS RAY IMPINGES
n: NORMAL VECTOR AT POSITION ON WHICH GENERAL RAY IMPINGES
s: UNIT VECTOR OF INCIDENT GENERAL RAY
s': UNIT VECTOR OF REFRACTED GENERAL RAY
b: VECTOR INDICATING OBJECT LINE
b': VECTOR INDICATING IMAGE LINE
r: HEIGHT VECTOR ON ENTRANCE PUPIL
r': HEIGHT VECTOR ON EXIT PUPIL
s: OBJECT SURFACE POSITION
s': IMAGE SURFACE POSITION
t: DISTANCE TO ENTRANCE PUPIL SURFACE
t': DISTANCE TO EXIT PUPIL SURFACE

OPTICAL SYSTEM

BACKGROUND OF THE INVENTION

1. Field of the Invention

This invention relates to an optical system, and particularly to an optical system including a curved surface (off-axial curved surface) on which with the route of a certain reference axis ray leading from an object surface to an image surface as a reference axis, a surface normal at a point on which the reference axis is incident does not coincide with the reference axis.

2. Related Background Art

As an optical system for forming the image of an object on an object surface onto an image surface, use has heretofore been made of a coaxial optical system in which on an optical axis, there is disposed a refracting surface or a reflecting surface rotation-symmetrical with respect to the optical axis.

Recently, however, in an image display apparatus such as a head mounting type display apparatus (HMD), an off-axial optical system using an asymmetrical aspherical surface not belonging to the category of the conventional coaxial optical system chiefly as a reflecting surface has come to be often seen. This is because the designing of such an optical system has become easy due to the improvements in the calculating capability of the computer and automatic designing technique.

In the above-described off-axial optical system, an off-axial reflecting surface or the like is used and therefore, the occurrence of eccentric aberration is unavoidable. Particularly, even in a light beam (on-axis light beam) relating to the center of the image field, astigmatism (on-axis astigmatism) occurs from the rotation asymmetry of the refractive power (power) of each surface.

In such an off-axial optical system, there is the condition that primary spherical aberration (on-axis astigmatism) can be corrected if all surfaces constituting the optical system are designed so as not to have azimuth dependency with respect to power.

However, if on an off-axial curved surface, the power thereof is designed so as not to have azimuth dependency, there arises the problem that the ratio of curvature in two cross-sections orthogonal to each other is determined and the degree of freedom of designing is taken away.

SUMMARY OF THE INVENTION

The present invention has as its object the provision of an optical system including an off-axial curved surface in which some of a plurality of groups (or surfaces) constituting it are designed such that the power thereof has azimuth dependency, and as a whole, the azimuth dependency of the power is null in such a manner that the some groups (or surfaces) negate the azimuth dependency with one another, and primary spherical aberration (on-axis astigmatism) is corrected.

The optical system of the present invention is (1-1) an optical system having three partial systems through which rays of light from an object pass, i.e., a first partial system having at least one off-axial curved surface, a second partial system and a third partial system having at least one off-axial curved surface, characterized in that when the route of a ray of light passing from the object through the center of a stop to the center of the last image surface is defined as a reference axis and the converted principal point interval between the first partial system and the second partial system is defined as e1 and the converted principal point interval between the second partial system and the third partial system is defined as e2 and the power of the second partial system at a certain azimuth angle is defined as $\phi 2\ (\xi)$, the condition that $$0.8 \leq |\phi 2(\xi)/\phi 2m| \leq 1.25$$

where $$\phi 2m = 1/2\pi \int_0^{2\pi} \phi 2(\xi) d\xi$$

is satisfied, and when the powers of the first partial system and the third partial system at a certain azimuth angle are defined as $\phi 1\ (\xi)$ and $\phi 3\ (\xi)$, respectively, the conditions that $$0.80 \leq (e1 + e2)/(e1 \cdot e2) \div \phi 2(\xi) \leq 1.25$$

$$0.80 \leq -[(e1/e2)^2(\phi 1(\xi) - \phi 1m)] \div (\phi 3(\xi) - \phi 3m) \leq 1.25$$

where $$\phi 1m = 1/2\pi \int_0^{2\pi} \phi 1(\xi) d\xi$$

$$\phi 3m = 1/2\pi \int_0^{2\pi} \phi 3(\xi) d\xi$$

are satisfied.

The optical system of the present invention is (1-2) an optical system having a transparent body provided with three reflecting surfaces by which rays of light from an object are internally reflected and pass, i.e., a first reflecting surface, a second reflecting surface and a third reflecting surface, characterized in that when the route of a ray of light passing from the object through the center of a stop to the center of the last image surface is defined as a reference axis and the converted interval between the first reflecting surface and the second reflecting surface is defined as e1 and the converted interval between the second reflecting surface and the third reflecting surface is defined as e2 and the power of the second reflecting surface at a certain azimuth angle is defined as $\phi 2\ (\xi)$, the condition that $$0.8 \leq |\phi 2(\xi)/\phi 2m| \leq 1.25$$

where $\phi 2m = 1/2\pi \int_0^{2\pi} \phi 2(\xi) d\xi$ is satisfied, and when the powers of the first reflecting surface and the third reflecting surface at a certain azimuth angle are defined as $\phi 1\ (\xi)$ and $\phi 3\ (\xi)$, respectively, the conditions that $$0.80 \leq (e1 + e2)/(e1 \cdot e2) \div \phi 2(\xi) \leq 1.25$$

$$0.80 \leq -[(e1/e2)^2(\phi 1(\xi) - \phi 1m)] \div (\phi 3(\xi) - \phi 3m) \leq 1.25$$

where $$\phi 1m = 1/2\pi \int_0^{2\pi} \phi 1(\xi) d\xi$$

-continued $$\phi 3m = 1/2\pi \int_0^{2\pi} \phi 3(\xi)d\xi$$

are satisfied.

The optical system of the present invention is (1-3) an optical system having three reflecting surfaces through which rays of light from an object pass, i.e., a first reflecting surface, a second reflecting surface and a third reflecting surface, characterized in that when the route of a ray of light passing from the object through the center of a stop to the center of the last image surface is defined as a reference axis and the converted interval between the first reflecting surface and the second reflecting surface is defined as e1 and the converted interval between the second reflecting surface and the third reflecting surface is defined as e2 and the power of the second reflecting surface at a certain azimuth angle is defined as $\phi 2$ ($\xi$), the condition that $$0.8 \le |\phi 2(\xi)/\phi 2m| \le 1.25$$

where $$\phi 2m = 1/2\pi \int_0^{2\pi} \phi 2(\xi)d\xi$$

is satisfied, and when the powers of the first reflecting surface and the third reflecting surface at a certain azimuth angle are defined as $\phi 1$ ($\xi$) and $\phi 3$ ($\xi$), respectively, the conditions that $$0.80 \le (e1+e2)/(e1\cdot e2) \div \phi 2(\xi) \le 1.25$$

$$0.80 \le -[(e1/e2)^2(\phi 1(\xi)-\phi 1m)] \div (\phi 3(\xi)-\phi 3m) \le 1.25$$

where $$\phi 1m = 1/2\pi \int_0^{2\pi} \phi 1(\xi)d\xi$$

$$\phi 3m = 1/2\pi \int_0^{2\pi} \phi 3(\xi)d\xi$$

are satisfied.

BRIEF DESCRIPTION OF THE DRAWINGS

FIGS. 5A, 5B and 5C show the azimuth dependency of the powers in each lens unit and the entire system of Embodiment 1.

FIGS. 8A, 8B and 8C show the azimuth dependency of the powers in each lens unit and the entire system of Embodiment 2.

FIG. 26 shows a paraxially developed coordinate system along a bent reference axis and various amounts used therein.

DESCRIPTION OF THE PREFERRED EMBODIMENTS

The focal length changing optical system of the present invention is a so-called eccentric or decentering optical system (off-axial optical system) using an eccentric or decentering reflecting surface. In such an eccentric system, there is the problem that it has no optical axis common to respective surfaces and therefore paraxial calculation is not general. So, in the present invention, the concept of a reference axis corresponding to the optical axis of a coaxial system is introduced, and a paraxial theory is evolved about this reference axis to thereby effect the designing of the eccentric optical system. The paraxial theory of the eccentric optical system (herein also called the off-axial optical system) will hereinafter be described.

<<Paraxial Theory of the Off-Axial Optical System>>

1. The Off-Axial Optical System and a Method of Expressing a Constituent Surface 1-1. Off-Axial Optical system In contrast with a coaxial optical system heretofore often used, the off-axial optical system and a reference axis which is the framework thereof will be defined as follows.

* Definition of the Reference Axis

Generally the optical path of a certain ray of light of a reference wavelength which is the reference leading from an object surface to an image surface is defined as the "reference axis" in that optical system. The ray of light which is the reference is not defined by this alone and therefore, usually the reference axis ray is set in conformity to one of the following two fundamental rules:

(1) When an axis having symmetry even partially is present in the optical system and the arrangement of aberrations in order can be done with good symmetry, a ray of light passing on the axis having symmetry shall be a reference-axis ray.

(2) When a symmetrical axis is generally not present in the optical system or when the arrangement of aberrations in order cannot be done with good symmetry even if a symmetrical axis is partially present, a ray of light passing from the center of an object surface (the center of a range to be photographed or to be observed) and then passing through the designated surface of the optical system and passing through the center of a stop in the optical system, or a ray of light passing through the center of the stop in the optical system to the center of the last image surface is set as a reference-axis ray, and the optical path thereof shall be a reference axis.

Figure 24:
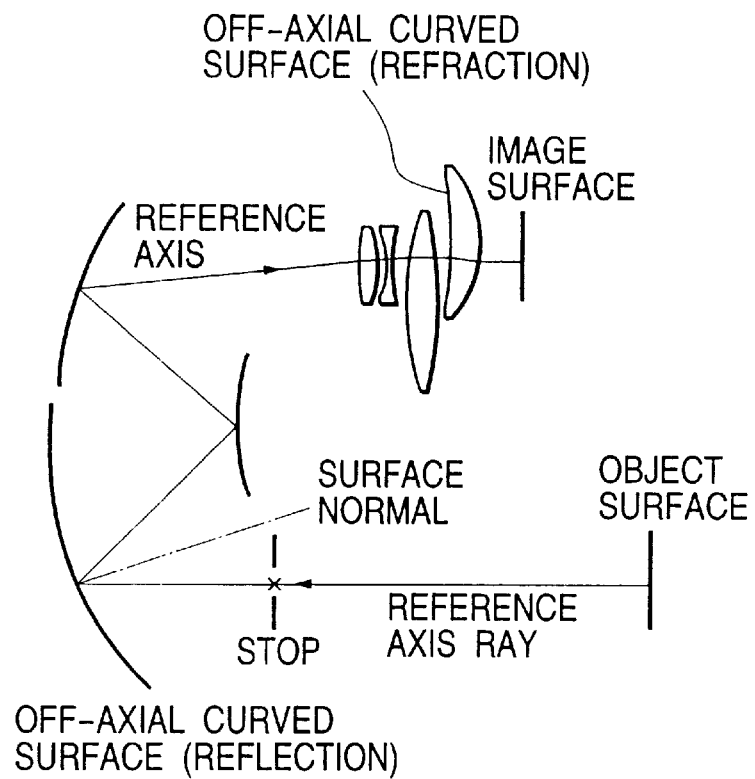
FIG. 24 shows an example of an off-axial optical system.

The reference axis defined in this manner is generally of a bent shape (see FIG. 24).

Here, in each surface, the point of intersection between each surface and the reference axis ray shall be the reference point of each surface, and the reference-axis ray on the object side of each surface shall be the incidence reference axis, and the reference axis ray on the image side of each surface shall be the emergence reference axis. Further, the reference axis shall have a direction (sense), and the direction shall be a direction in which the reference axis ray travels when it is imaged. Consequently, the incidence reference axis direction and the emergence reference axis direction exist on the incidence and emergence sides, respectively. In this manner, the reference axis finally arrives at the image surface while having its direction changed along the order of the set surfaces in accordance with the law of refraction or reflection.

In an optical element (optical system) constituted by a plurality of surfaces, the reference-axis ray incident on the surface thereof most adjacent to the object side shall be the incidence reference axis of this optical element (optical system), and the reference-axis ray emerging from the surface thereof most adjacent to the image side shall be the emergence reference axis of this optical element (optical system). Also, the definition of the directions of these incidence and emergence reference axes is the same as that in the case of the surfaces.

* Definition of the Off-Axial Optical System

An optical system including a curved surface (off-axial curved surface) in which at the reference point whereat the reference axis defined as described above intersects with a curved surface, a surface normal does not coincide with the reference axis is defined as an off-axial optical system, and an example thereof is shown in FIG. 24. (However, also when the reference axis is simply bent by a flat reflecting surface, the surface normal does not coincide with the reference axis, but yet the flat reflecting surface does not spoil the symmetry of aberration and is therefore excluded from the subject of the off-axial optical system.)

This definition also covers an optical system in which a part of a coaxial optical system is greatly eccentric, but generally in an asymmetrical aspherical system, there is no point or line having the symmetry of the meaning of "centric" in "eccentric". So, in this paraxial theory, the word "eccentric" is not positively used, but the word "off-axial" is used.

1-2. Method of Expressing a Surface Shape Suited for the Constituent Surface of the Off-Axial Optical System Surfaces constituting the off-axial optical system generally do not have symmetry. Most popular as a method of expressing a surface which does not have symmetry is two-variable power series evolution to the center of evolution. Here, the center of evolution is the point of intersection between the surface and the reference axis, i.e., the reference point, and as a local coordinate system for expressing the surface shape thereof, use is made of the z-axis set to a surface normal. An expression representing the shape is expressed as the form of $Z=f(x, y)$. At that time, evolution is begun from secondary so that the surface normal at the reference point may not change with a change in the surface shape, and is represented as follows.

$$z(x, y) = C_{20}x^2 + 2C_{11}xy + C_{02}y^2 + D_{30}x^3 + 3D_{21}x^2y + 3D_{12}xy^2 + D_{03}y^3 + E_{40}x^4 + 4E_{31}x^3y + 6E_{22}x^2y^2 + 4E_{13}xy^3 + E_{04}y^4 + \ldots \quad \text{(numerical expression 1)}$$

Figure 25:
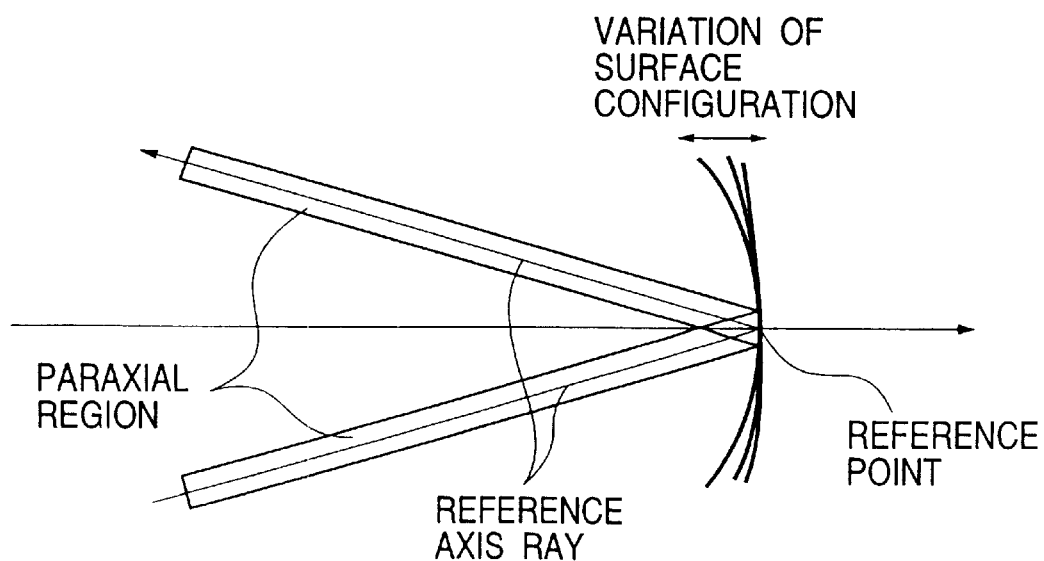
FIG. 25 shows a method of expression in which the point of intersection between the reference axis and surface of an off-axial optical system used in the present invention is the origin.

If the constituent surface is defined by the use of the technique of evolving with the surface normal thus fixed about the reference point, the surface shape can be changed without the framework of the optical arrangement (the disposition of the reference axis) being changed, as shown in FIG. 25, unlike the conventional method of designing an off-axial optical system. Further, if only the tertiary and subsequent coefficients are changed with the secondary evolution coefficient also fixed, only aberration correction can also be effected without the paraxial amount at each azimuth (see the result of (numerical expression 8) to (numerical expression 11) which will be described later) being changed.

2. Technique of Paraxial Evolution along a Bent Reference Axis

FIG. 26 shows the coordinate system of paraxial evolution along a bent reference axis used in the analysis and various amounts used therein. Reflection can be generalized with refraction in which the refractive index is negative and therefore, evolution is considered in a refracting system. In this figure, in the portions of an object and an image, a local coordinate system is taken along the reference axis, and the object surface, the image surface, the entrance pupil surface and the exit pupil surface are defined perpendicularly to the reference axis as shown. The surface shape, as previously described, is expressed by a local coordinate system having a surface normal as the z-axis. At this time, consider a ray of light passing through an object line vector b and a height vector r on the entrance pupil, and consider that the object line vector b and the height vector r power-series-evolve the law of refraction as a minute amount. The procedure of this is as follows.

i) The direction vector s of the ray of light is represented by the use of a distance s, the absolute value b of the object line vector b and the azimuth $\xi$ of the object line vector b (the refracting surface of the reference axis is taken as $\xi=0$), the distance t to the entrance pupil, the absolute value r of the height vector r and $\xi_r=\xi+\phi$ (the azimuth of the height vector ri $\phi$ is the relative azimuth).

ii) The point of intersection on the refracting surface is found by the use of the starting point vector and the direction vector found in item 1) above and the expression of the surface shape.

iii) The surface normal vector n at the point of intersection of item ii) above is found by the technique of vector analysis.

iv) The direction vector s' after refraction at the point of intersection is found by the use of the result of iii) above and the law of refraction.

v) Since the position on the refracting surface and the direction vector s' after refraction have been found, the image line vector b' and the height vector r' on the exit pupil are found if the distance s' to the image surface and the distance t' to the exit pupil are given.

The result of evolution to the distance b of the image line vector b' and the primary amount of the absolute value r of the height vector by this procedure is shown in (numerical expression 2) and (numerical expression 3). However, $\xi'$ is the ideal azimuth of the image line on the image surface and is taken as $\xi'=\xi$.

path has been projected onto the azimuth cross-section and for $\Delta\perp$, the imaging conjugate relation expression is found from the expression of the coefficient of $\Delta\|=0$, the expression of this coefficient shows that the imaging position generally differs (has so-called astigmatism) between the ray of relative azimuth $\phi=0$ (corresponding to the meridional ray) and the ray of $\phi=\pi/2$ (corresponding to the sagittal ray).

In contrast with this astigmatism on the axis, in the present theory, the imaging surface when the relative azimuth $\phi=0$ is defined as the paraxial image surface, and the theory is built on the assumption that when $\phi\neq 0$, on-axis astigmatism remains. As the imaging relation expression projected by the definition of such an image surface:

(numerical expression 2)

$$\Delta_{\|} = r\begin{pmatrix} s(\cos\theta^*\cos\xi'\cos(\xi+\phi)+\cos\theta\sin\xi'\sin(\xi+\phi))/(\cos\theta(s-t)) & -s^*N(\cos\theta'\sin\xi'\sin(\xi+\phi)+\cos\theta\cos\xi'\cos(\xi+\phi))/(N'\cos\theta'(s-t)) \\ -2s\,s'(N'\cos\theta'-N\cos\theta)\{\cos\xi'\cos(\xi+\phi)C02+(\cos\phi'\sin\xi'\cos(\xi+\phi)+\cos\theta\cos\xi'\sin(\xi+\phi))C11+\cos\theta\cos\theta'\sin\xi'\sin(\xi+\phi)C20\} \\ /(N'\cos\theta\cos\theta'(s-t)) \end{pmatrix} -$$

$$b\begin{pmatrix} \beta+t(\cos\theta'\cos\xi'\cos\xi+\cos\theta\sin\xi'\sin\xi)/(\cos\theta(s-t)) & -s^*N(\cos\theta'\sin\xi'\sin\xi+\cos\theta\cos\xi'\cos\xi)/(N'\cos\theta'(s-t)) \\ -2t\,s'(N'\cos\theta'-N\cos\theta)\{\cos\xi'\cos\xi C02+(\cos\theta'\sin\xi'\cos\xi+\cos\theta\cos\xi'\sin\xi)C11+\cos\theta\cos\theta'\sin\xi'\sin\xi C20\} \\ /(N'\cos\theta\cos\theta'(s-t)) \end{pmatrix}$$

(numerical expression 3)

$$\Delta_\perp = \partial\Delta_\|/\partial\xi'$$

$$= r\begin{pmatrix} s(-\cos\theta'\sin\xi'\cos(\xi+\phi)+\cos\theta\cos\xi'\sin(\xi+\phi))/(\cos\theta(s-t)) & -s^*N(\cos\theta'\cos\xi'\sin(\xi+\phi)-\cos\theta\sin\xi'\cos(\xi+\phi))/(N'\cos\theta'(s-t)) \\ -2s\,s'(N'\cos\theta'-N\cos\theta)\{-\sin\xi'\cos(\xi+\phi)C02+(\cos\theta\cos\xi'\cos(\xi+\phi)-\cos\theta\sin\xi'\sin(\xi'+\phi))C11+\cos\theta\cos\theta'\cos\xi'\sin(\xi+\phi)C20\} \\ /(N'\cos\theta\cos\theta'(s-t)) \end{pmatrix} -$$

$$b\begin{pmatrix} t(-\cos\theta'\sin\xi'\cos\xi+\cos\theta\cos\xi'\sin\xi)/(\cos\theta(s-t)) & -s'N(\cos\theta'\cos\xi'\sin\xi-\cos\theta\sin\xi'\cos\xi)/(N'\cos\theta'(s-t)) \\ -2t\,s'(N'\cos\theta'-N\cos\theta)\{-\sin\xi'\cos\xi C02+(\cos\theta'\cos\xi'\cos\xi-\cos\theta\sin\xi'\sin\xi)C11+\cos\theta\cos\theta'\cos\xi'\sin\xi C20\} \\ /(N'\cos\theta\cos\theta'(s-t)) \end{pmatrix}$$

Figure 27:
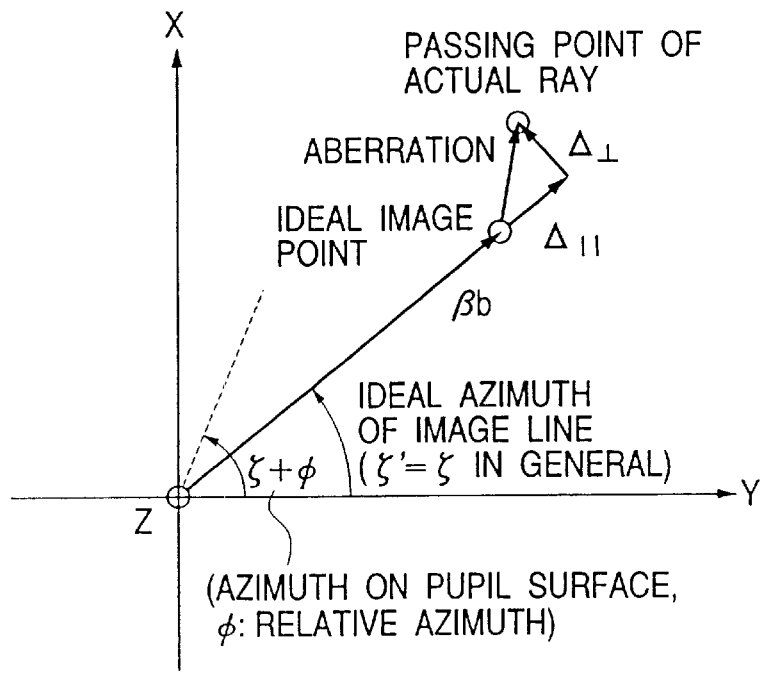
FIG. 27 shows the decomposition of the components of an image point vector.

In the result of this, the image line vector b', as shown in FIG. 27, is expressed by being decomposed into components in the form of $b'=\beta b+\Delta\|+\Delta\perp$, (numerical expression 4) where $\beta b+\Delta\|$ represents a parallel component vector to the azimuth $\xi$ ($\beta$ is the lateral magnification of projection determined by (numerical expression 11) which will be described later), and $\Delta\perp$ represents a perpendicular component vector.

3. The Derivation of Expression of the Imaging by the Off-Axial Optical System and the Paraxial Amount of Refraction 3-1. The Derivation of the Expression of the Imaging by the Off-Axial Optical System When the paraxial relation is to be found by the use of the results of (numerical expression 2) and (numerical expression 3), the object height b may be put as 0. Accordingly, the primary coefficients of proportion of $\Delta\|$ and r of $\Delta\perp$ can be examined, but reflecting the fact that due to the rotation asymmetry of the system, the paraxial ray is at a position twisted relative to the reference axis, these two coefficients have azimuth dependency and generally the two coefficients cannot be rendered into 0 at a time. Although generally, in an anamorphic optical system wherein such a paraxial ray is at a position twisted relative to the reference axis, an imaging conjugate relation expression and a paraxial amount are defined by the coefficient of $\Delta\|=0$ in which the optical (numerical expression 5)

$N'(\cos\theta'\cos\xi'\cos\xi+\cos\theta\sin\xi'\sin\xi)/(s'\cos\theta) -$ $N(\cos\theta'\sin\xi'\sin\xi+\cos\theta\cos\xi'\cos\xi)/$ $(s\cos\theta')-2(N'\cos\theta'-N\cos\theta)$ $\{\cos\xi'\cos\xi C_{02}+(\cos\theta'\sin\xi'\cos\xi+$ $\cos\theta\cos\xi'\sin\xi)C_{11}+$ $\cos\theta\cos\theta'\sin\xi'\sin\xi C_{20}\}/(\cos\theta\cos\theta')=0$ is found, but this becomes the imaging expression of the pupil surface simply by changing s and s' into t and t' and therefore, it is seen that this is a rational definition which becomes the general expansion of the conventional coaxial system.

3-2. The Derivation of the Paraxial Amount of the Refracting Surface and the Expression of the Formula of Refraction by Gaussian Bracket Next, consider to compare this projected imaging relation expression with the expression of imaging by the conventional coaxial system (N'A)/S'−(ND)/S−Φ=0.  (numerical expression 6)

Here, A and D represent the diagonal components of the gaussian bracket of refraction indicated by $$\begin{bmatrix} h' \\ \alpha' \end{bmatrix} = \begin{bmatrix} A & O \\ \Phi & D \end{bmatrix} \begin{bmatrix} h \\ \alpha \end{bmatrix} \quad \text{(numerical expression 7)}$$

$(h' = Ah, \alpha' = \Phi h + D\alpha)$ and $\Phi$ represents power (when the components B=0 and AD=1).

As will be immediately seen, these two expressions are of entirely the same form and therefore, the paraxial amount of the off-axial refracting surface corresponding to this imaging expression can be determined by comparison. That is, if consideration is done with the paraxial ray projected, the calculation of the paraxial amount can be done at each azimuth as in the case of the coaxial system. The results A, D and $\Phi$ are shown in (numerical expression 8) to (numerical expression 10).

$$A = \sqrt{\frac{\cos\theta'(\cos\theta'\cos\xi'\cos\xi + \cos\theta\sin\xi'\sin\xi)}{\cos\theta(\cos\theta'\sin\xi'\sin\xi + \cos\theta\cos\xi'\cos\xi)}} \quad \text{(numerical expression 8)}$$

$$D = 1/A = \sqrt{\frac{\cos\theta(\cos\theta'\sin\xi'\sin\xi + \cos\theta\cos\xi'\cos\xi)}{\cos\theta'(\cos\theta'\cos\xi'\cos\xi + \cos\theta\sin\xi'\sin\xi)}} \quad \text{(numerical expression 9)}$$

$$\Phi = \frac{2(N'\cos\theta' - N\cos\theta)(\cos\xi'\cos\xi C02 + (\cos\theta'\sin\xi\cos\xi + \cos\theta\cos\xi'\sin\xi)C11 + \cos\theta\cos\theta'\sin\xi'\sin\xi C20)}{\sqrt{\cos\theta\cos\theta'(\cos\theta'\cos\xi'\cos\xi + \cos\theta\sin\xi'\sin\xi)(\cos\theta'\sin\xi'\sin\xi + \cos\theta\cos\xi'\cos\xi)}} \quad \text{(numerical expression 10)}$$

It can also be shown that the lateral magnification of the projection on the refracting surface is given as $\beta = \alpha/\alpha' = Ns'D/(N's)$. (numerical expression 11)

Here, it is noteworthy that the paraxial amount shown in (numerical expression 8) to (numerical expression 11) is the general expansion of the paraxial amount of the conventional coaxial system. This can be easily confirmed by the fact that if $\theta = \theta' = 0$, $C_{11} = 0$ and $C_{20} = C_{02} = 1/(2r)$ (r being the radius of curvature) which are the conditions of coaxis and rotation symmetry are substituted for these expressions, the expression in the case of the coaxial system is obtained.

4. Paraxial Trace 4-1. Gaussian Bracket of Transfer

While as described above, the paraxial amount of refraction could be defined by the technique using a Gaussian bracket in each surface of the off-axial system, it is necessary in a system comprised of a plurality of surfaces to define the transfer term between a surface and a surface. Also in the case of the off-axial system, it can be seen by simple geometrical consideration that if a length d' is defined along the reference axis, expression (numerical expression 12) using a Gaussian bracket can be done using a converted surface interval e'=d'/N' as in the prior art.

$$\begin{bmatrix} 1 & -e' \\ 0 & 1 \end{bmatrix} \quad \text{(numerical expression 12)}$$

Accordingly, even in a system having a plurality of off-axial surfaces, paraxial trace is possible at each azimuth as in the prior art. That is, the framework of the entire off-axial optical system can be paraxially analyzed as in the case of the coaxial system.

4-2. Technique of Paraxial Trace

Paraxial trace similar to that in the case of the coaxial system is possible if use is made of the expressions of refraction found in item 3-2 above, i.e., $h_i' = A_i \cdot h_i$ (numerical expression 13)

$\alpha_i' = \Phi_i \cdot h_i + D_i \cdot \alpha_i$ (numerical expression 14)

and the expressions of transfer found in items 4-1 above, i.e., $h_{i+1} = h_i' - e_i \cdot \alpha_i'$ (numerical expression 15)

$\alpha_{i+1} = \alpha_i'$ (numerical expression 16).

The differences from the coaxial system are that $A_i$ and $D_i$ in the expressions of refraction are generally not 1 and that $A_i$, $D_i$ and $\Phi_i$ have azimuth dependency. Accordingly, if the paraxial amount at each azimuth is calculated, it is possible to examine the azimuth dependency of the paraxial amount. (In the numerical expressions herein, the symbol · or * represents multiplication.)

The flow of paraxial trace calculation to a given azimuth $\xi$ is shown below.

i) For the given data of the optical system such as $s_1$, the initial values $h_1$ and $\alpha_1$ ($\alpha_1 = N_1 h_1/s_1$) of paraxial trace are set.

ii) The paraxial amounts $A_i$, $\Phi_i$ and $D_i$ on the refracting surface are found.

iii) By the use of the expressions of refraction, $h_1'$ and $\alpha_i'$ are found.

Also, if necessary, $s_i$, $s_i'$ and the lateral magnification $\beta_i$ in the refracting surface are found by the use of $s_i = N_i \cdot h_i/\alpha_i$ (numerical expression 17)

$s_i' = N_i \cdot h_i'/\alpha_i'$ (numerical expression 18)

$\beta_i = \alpha_i/\alpha_i'$ (numerical expression 19).

iv) If the surface No. i is not that of the last surface, $h_{i+1}$ and $\alpha_{i+1}$ are found by the use of the expressions of transfer.

v) ii) to iv) are repeated until the surface No. i becomes the No. k of the last surface.

vi) The components A, B, $\Phi$ and D of the Gaussian bracket of the entire system are found so that $h_k'$ and $\alpha_k'$ when the surface No. i found by the above-described calculation is the No. k of the last surface may always satisfy $h_k' = A h_1 + B \alpha_1$ (numerical expression 20)

$\alpha_k' = \Phi h_1 + D \alpha_1$ (numerical expression 21)

vii) By the use of found A, B, $\Phi$ and D of the entire system, the focal length f, the principal point positions H and H' and the back focal length $S_k'$ are found by expressions $f = 1/\Phi$ (numerical expression 22)

Figure 28:
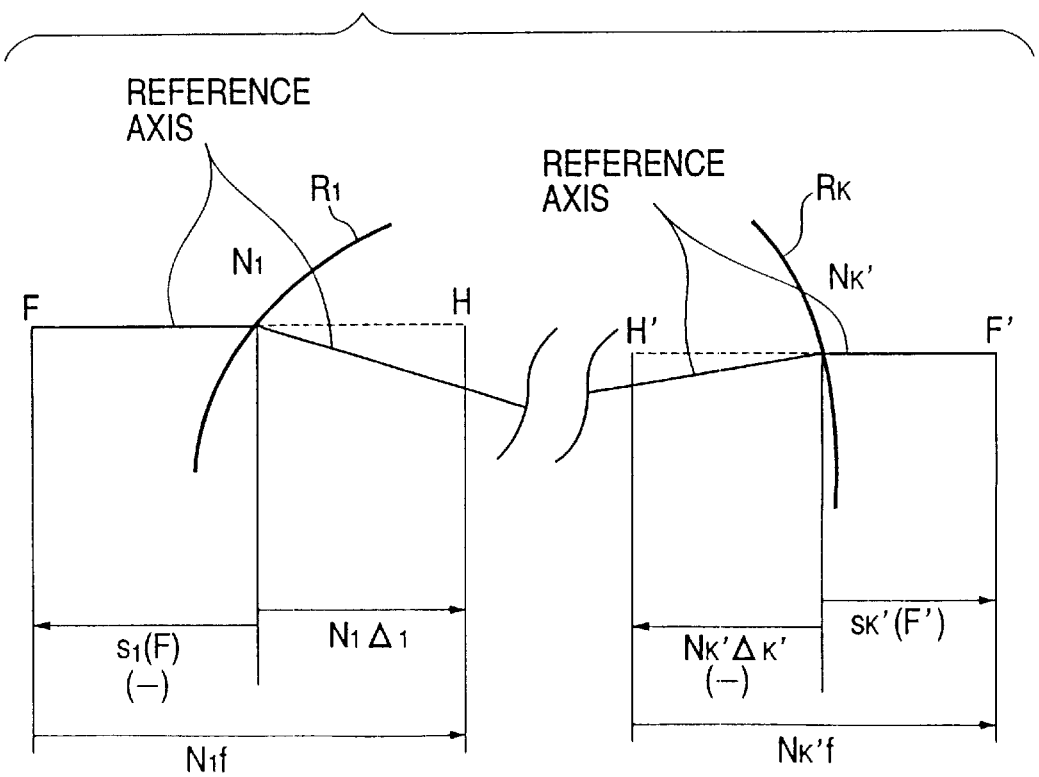
FIG. 28 shows the principal point, focal point and focal length of the off-axial optical system.

$\Delta 1 = (1-D)/\Phi, H = N_1 \Delta_1$ (numerical expression 23)

$$\Delta_k'=(A-1)/\Phi, H'=N_k'\Delta_k' \quad \text{(numerical expression 24)}$$

$$s_k'=N_k'(f+\Delta_k') \quad \text{(numerical expression 25)}$$

which are similar to those of the coaxial system. (see FIG. 28: in FIG. 28, F represents the object side focal point, H represents the object side principal point, F' represents the image side focal point, and H' represents the image side principal point.)

iii) The lateral magnification β of the entire system is found by $$\beta=\alpha_1/\alpha_k' \quad \text{(numerical expression 26).}$$

5. Analysis and Confirmation by a Simple Surface

Here, consider the application of the paraxial theory found about a simple surface.

* Off-Axial Reflecting Surface

In the off-axial reflecting surface, θ=−θ' and therefore, A and D of the Gaussian bracket become the same as those of the coaxial system, i.e., 1. In this case, the power of the reflecting surface becomes anamorphic one depending on the angle of incidence θ and the azimuth ξ besides the curvature.

Here, if the coefficients $C_{20}$, $C_{11}$ and $C_{02}$ of the surface shape proportional to the curvature are chosen so as to satisfy $$C_{11}=0, C_{02}=C_{20}\cos^2\theta, \quad \text{(numerical expression 27)}$$

the power of the reflecting surface can be made so as not to depend on the azimuth ξ.

That is, in the off-axial reflecting surface, the coefficients of the surface shape in x and y directions are chosen so as to satisfy $C_{11}=0$ and $C_{02}=C_{20}\cos^2\theta$, whereby handling paraxially similar to that for a coaxial rotation-symmetrical system can be done.

Figure 29:
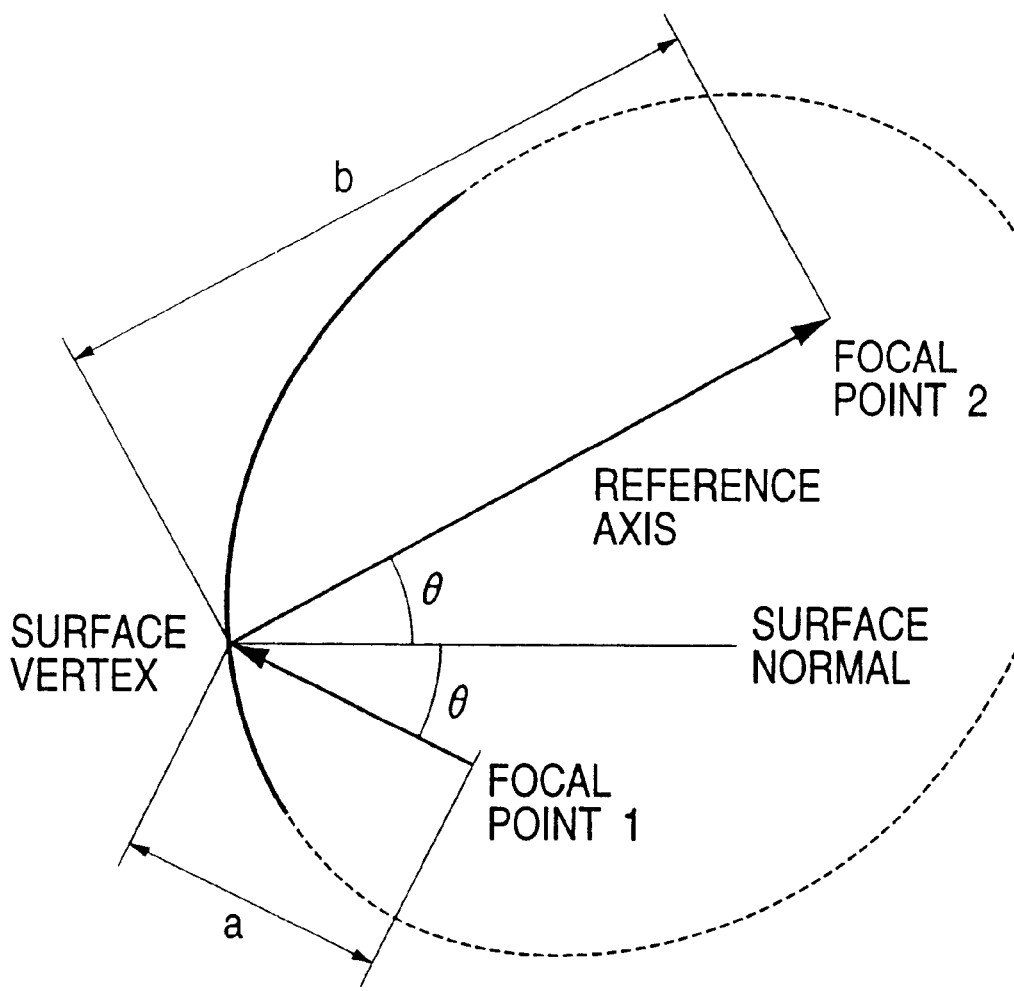
FIG. 29 shows an example of an off-axial reflection quadratic surface in which the reference axis passes through two focal points.

Particularly in the off-axial reflecting quadratic surface as shown in FIG. 29 wherein the reference axis passes through two focal points, this relation is generally satisfied. Thus, if the curvature at the surface vertex of the system of this figure is found, the general expression (numerical expression 28) of the off-axial reflecting quadratic surface in which the reference axis to be described passes through two focal points is evolved into power series and made into the form of (numerical expression 1) and the coefficients thereof are compared, whereby $$C_{02}=(1/a+1/b)\cos\theta/4, C_{20}=(1/a+1/b)/(4\cos\theta),$$

$C_{11}=0$ are obtained and can be easily ascertained. Also, if in the case of this figure, a and b are the distances between the two focal points and the surface vertex, the power of the reflecting surface is intuitionally understood as 1/a+1/b, but this can also be ascertained at the same time by a calculation using (numerical expression 10).

The coefficient of the secondary term when a general spherical expression is series-evolved is represented by 1/(2r) when the radius of curvature is defined as r and therefore, if in the coordinate system in (numerical expression 1), the radius of curvature of the paraxial region in xz plane is defined as $r_x$ and the radius of curvature of the paraxial region in yz plane is defined as $r_y$, the aforementioned coefficient is represented as $$C_{20}=1/(2r_x) C_{02}=1/(2r_y).$$

Consequently, if from (numerical expression 27), the relation that $$(r_x/r_y)\cdot(1/\cos^2\theta)=1 \quad \text{(numerical expression 28)}$$

is satisfied, the focal lengths at all azimuths coincide with one another on the eccentric reflecting surface.

6. Application to Design

The paraxial theory of the off-axial system and the technique of paraxial trace built in the manner described above can be applied to the design the off-axial system. Generally in the case of isotropic imaging in which magnification does not depend on azimuth, it is considered that in the entire system, every paraxial amount has no azimuth dependency and therefore, design can be done, for example, in the following procedure.

i) The optical system is disposed along a bent reference axis with the interference of the optical path or the like taken into consideration.

ii) Next, by the use of the technique of Gaussian bracket, paraxial trace is effected at each azimuth and the curvature of each surface is determined so that the paraxial amount and image surface position of the entire system may not have azimuth dependency.

Such a designing technique which has paid attention to the azimuth dependency of the paraxial amount is an entirely novel way of view and gives a great guide to the design of the off-axial system.

Now, to prevent the paraxial amount of the entire system from having azimuth dependency, design can be made such that each reflecting surface and refracting surface constituting the optical system do not have azimuth dependency. However, to prevent each surface from having azimuth dependency, the relation between the curvature of each surface in xz plane and the curvature of each surface in yz plane is prescribed.

Also, what is required as the performance of the optical system is the final imaging state, and whatever may be the imaging state of the interior (middle) of the optical system.

So, from the fact that even if each surface has azimuth dependency, it will suffice if the paraxial amount of the entire system, i.e., A, Φ and D of the Gaussian bracket do not depend on the azimuth ξ, consider to design so as to satisfy $$dA/d\xi=0$$

$$d\Phi/d\xi=0$$

$$dD/d\xi=0.$$

To solve this, three variables are necessary.

Assuming that the optical system is constituted by three reflecting surfaces and the powers of the respective surfaces are $\phi_1$ (ξ), $\phi_2$ (ξ) and $\phi_3$ (ξ) and the converted intervals (intervals converted into dimensions in the air) among the respective surfaces are defined as $e_1$ and $e_2$, there are obtained $$\phi_2(\xi)=(e_1+e_2)/(e_1*e_2) \quad (1)$$

$$\phi_3(\xi)=-[(e_1/e_2)^2(\phi_1(\xi)-\phi_1 m)]. \quad (2)$$

what these expressions mean is that the second surface is an isotropic surface free of azimuth dependency, and the first surface and the third surface are located at conjugate positions with respect to this second surface, and the azimuth dependency of the first surface and the azimuth dependency of the third surface try to negate the azimuth dependency of the entire system.

Specifically, if when the power of the second partial system at any azimuth angle is φ2 (ξ), the condition that $$0.8 \leq |\phi 2(\xi)/\phi 2m| \leq 1.25$$

where $\phi 2m = 1/2\pi \int_0^{2\pi} \phi 2(\xi) d\xi$ is satisfied and when the powers of the first partial system and the third partial system at any azimuth angle are $\phi 1(\xi)$ and $\phi 3(\xi)$, respectively, the conditions that $$0.80 \leq (e1+e2)/(e1 \cdot e2) \div \phi 2(\xi) \leq 1.25$$

$$0.80 \leq -[(e1/e2)^2(\phi 1(\xi)-\phi 1m)] \div (\phi 3(\xi)-\phi 3m) \leq 1.25$$

where $$\phi 1m = 1/2\pi \int_0^{2\pi} \phi 1(\xi) d\xi$$

$$\phi 3m = 1/2\pi \int_0^{2\pi} \phi 3(\xi) d\xi$$

are satisfied, it is possible to correct the azimuth dependency of the entire system well.

This idea can be expanded from surface to lens unit. In that case, it will be good if the second lens unit is a lens unit free of azimuth dependency as a whole and the converted principal point interval (principal point interval converted into a demension in the air) from the image side principal point of the first group to the object side principal point of the second lens unit is defined as $e_1$ and the converted principal point interval from the image side principal point of the second lens unit to the object side principal point of the third lens unit is defined as $e_2$ and the image side principal point of the first lens unit and the object side principal point of the third lens unit are set at conjugate positions with respect to the second lens unit.

What has been described above is the explanation of the paraxial theory to the off-axial optical system and a method of designing the framework of an optical system using the same.

The basic construction of the optical system of the present invention will hereinafter be described on the basis of the above-described definition of the paraxial theory of the off-axial optical system.

Figure 1:
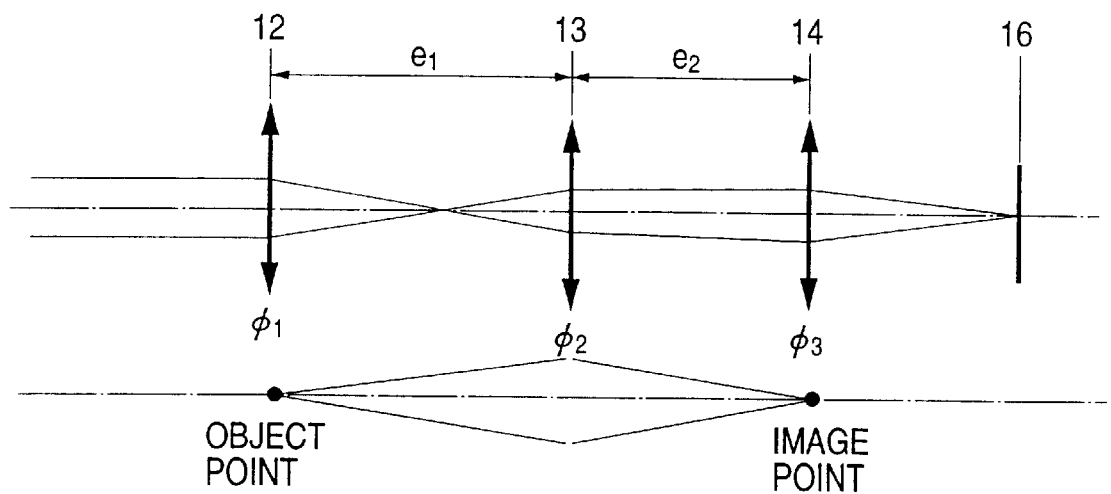
FIG. 1 shows the basic construction of the optical system of the present invention as a coaxial system.

FIG. 1 shows the basic construction of the optical system of the present invention as a coaxial system. A light beam coming from the object side passes through a first lens unit 12, a second lens unit 13 and a third lens unit 14 in the named order, and is imaged on the last imaging surface 16. The first lens unit 12 has the azimuth dependency of power, the second lens unit 13 does not have the azimuth dependency of power, and the third lens unit 14 has the azimuth dependency of power.

The Gaussian bracket of the composite system of the three lens units is $$\phi = \phi_1 + \phi_2 + \phi_3 - e_1\phi_1 \cdot \phi_2 -$$
$$e_1\phi_1 \cdot \phi_3 - e_2\phi_1 \cdot \phi_3 - e_2\phi_2 \cdot \phi_3 + e_1e_2\phi_1 \cdot \phi_2 \cdot \phi_3$$
$$A = 1 - e_1\phi_1 - e_2\phi_2 - e_2\phi_1 + e_1e_2\phi_1 \cdot \phi_2$$
$$D = 1 - e_1\phi_3 - e_2\phi_3 - e_1\phi_2 + e_1e_2\phi_2 \cdot \phi_3.$$

Here, by the power of the second group being $$\phi_2 = (e_1 + e_2)/(e_1 * e_2),$$

the image side principal point position of the first lens unit and the object side principal point position of the third lens unit become a relation conjugate to the second lens unit. This shows that if as shown in the lower portion of FIG. 1, the object point is put at the image side principal point position of the first lens unit, the image point is formed at the object side principal point position of the third lens unit. Assuming that relating the power $\phi_3(\xi)$ of the third lens unit with the power $\phi_1(\xi)$ of the first lens unit, $$\phi_3(\xi) = -[(e_1/e_2)^2(\phi 1(\xi)-\phi 1m)],$$

the power of the entire system becomes $$\phi = (e_1+e_2-\phi 1m*e_2^2)/e_1*e_2)$$

and the system can be constructed such that the first lens unit and the third lens unit have azimuth dependency, but yet the whole does not have azimuth dependency.

If design is made so as to satisfy the above two equalities, azimuth dependency will become completely null, but even if there is some deviation from the equalities, the azimuth dependency of the power of the entire system will not become so great. This become entangled with the problem of to what extent azimuth dependency can be permitted in conformity with the use of the optical system.

Figure 2:
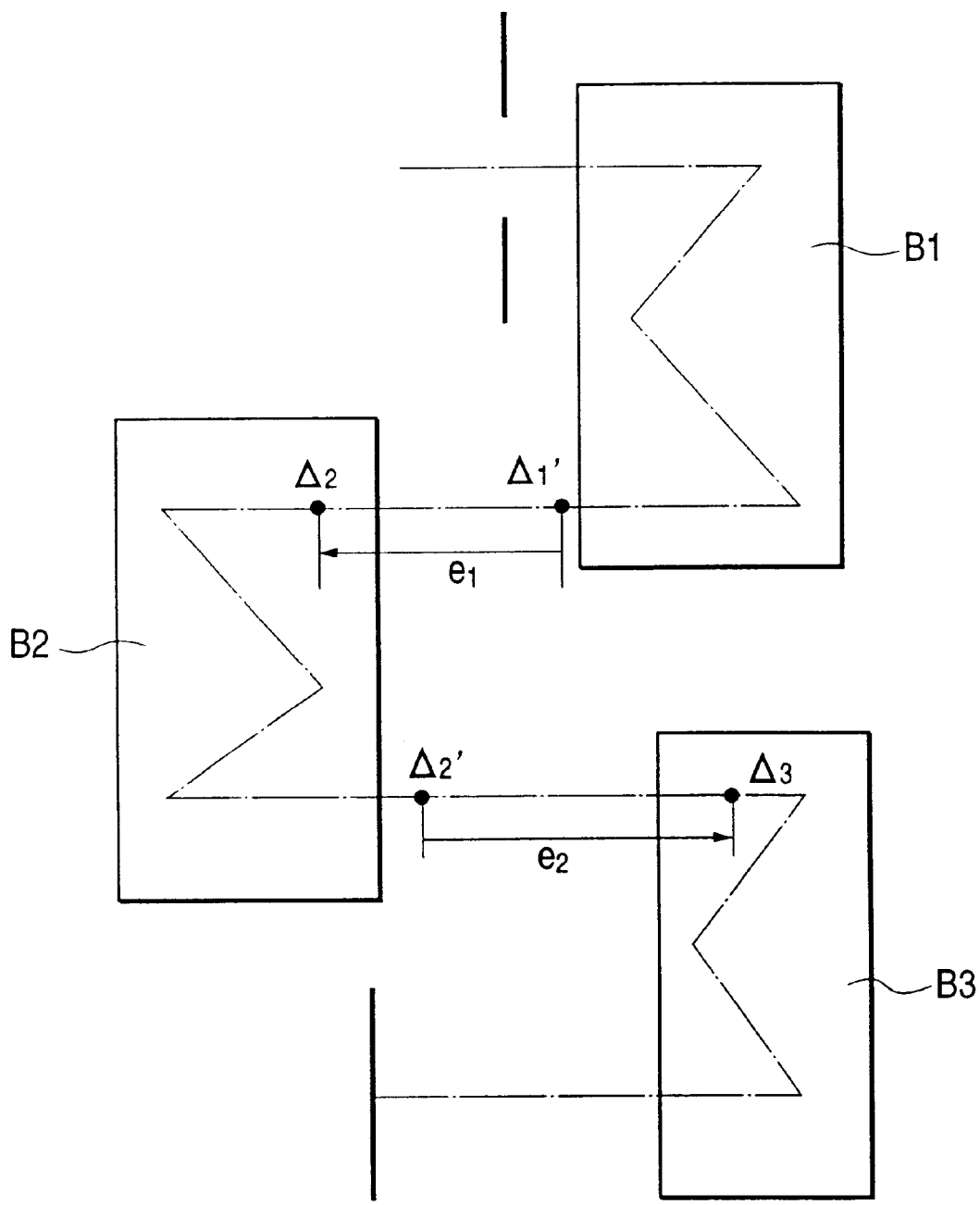
FIG. 2 shows the specific construction of the optical system of the present invention.

FIG. 2 shows the specific construction of the optical arrangement of FIG. 1. In FIG. 2, the reference characters B1, B2 and B3 designate a first lens unit (or a first partial system), a second lens unit (or a second partial system) and a third lens unit (or a third partial system), respectively, having a plurality of off-axial reflecting surfaces, and correspond to the first lens unit 12, the second lens unit 13 and the third lens unit 14, respectively, in FIG. 1. A dot-and-dash line indicates a principal ray of the central angle of view and this principal ray repeats reflection in each lens unit by a reflecting surface, not shown, and passes to the last imaging surface 16 via each lens unit. Thus, the optical system of the present invention is an off-axial reflecting system, and an optical axis called so in a coaxial system does not definitely exist in it. Consequently, as previously described, the reference axis is defined with one of rays of light leaving the center of the object surface which passes through the center of a stop defined in the optical system to the center of the last image surface as a reference ray. In FIG. 2, a dot-and-dash line indicates the reference ray. The object side principal point of each lens unit lies on the entrance reference axis, and the image side principal point of each lens unit lies on the exit reference axis.

Before describing embodiments, description will be made of how to represent the constituent numerical data of each embodiment and matters common to all embodiments.

Figure 3:
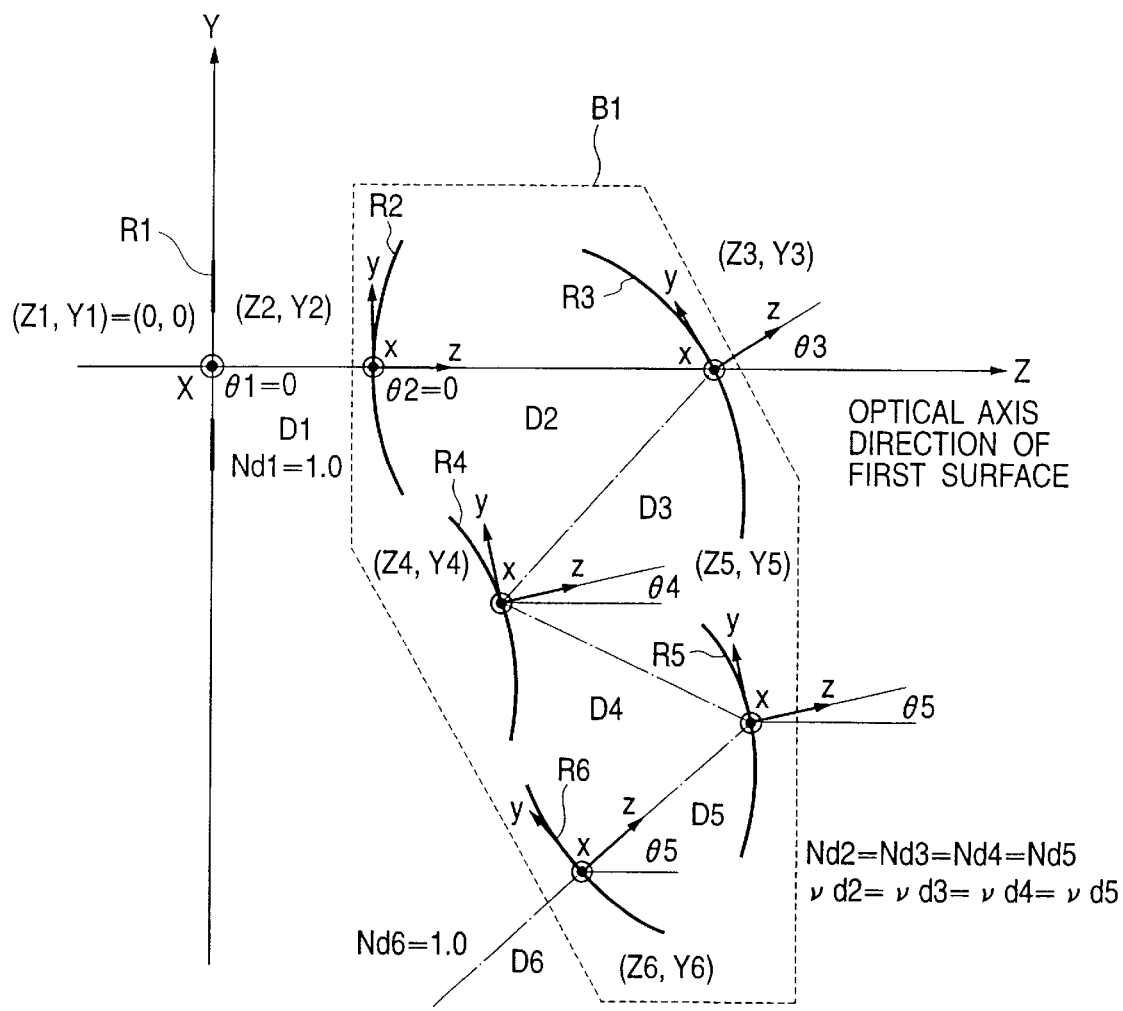
FIG. 3 is an illustration of a coordinate system.

FIG. 3 is an illustration of a coordinate system defining the construction data of the optical system of the present invention. In the embodiments of the present invention, the ith surface along a ray travelling from the object side to the image surface (which is indicated by the dot-and-dash line in FIG. 3 and is called the reference-axis ray) shall be the ith surface.

In FIG. 3, the first surface R1 is a stop, the second surface R2 is a refracting surface coaxial with the first surface, the third surface R3 is a reflecting surface tilted relative to the second surface R2, the fourth surface R4 and the fifth surface R5 are reflecting surfaces shifted and tilted relative to their preceding surfaces, and the sixth surface R6 is a refracting surface shifted and tilted relative to the fifth surface R5. Each of the second surface R2 to the sixth surface R6 is constructed on an optical element formed of a medium such as glass or plastic, and in FIG. 3, it is the first optical element B1.

Accordingly, in the construction of FIG. 3, the medium of the object surface, not shown, to the second surface R2 is air, the medium of the second surface R2 to the sixth surface R6 is a certain common medium, and the medium of the sixth surface R6 to the seventh surface R7, not shown, is air.

The optical system of the present invention is an off-axial optical system and therefore, the surfaces constituting the optical system do not have a common optical axis. So, in the embodiments of the present invention, an absolute coordinate system having the center of the effective diameter of the ray of the first surface R1 as the origin is first set. In the present embodiment, the axes of the absolute coordinate system are defined as follows:

Z-axis: reference axis passing through the origin to the second surface R2

Y-axis: straight line passing through the origin and counter-clockwisely forming 90° with respect to the Z-axis in a tilt plane (the plane of the drawing sheet of FIG. 3)

X-axis: straight line passing through the origin and perpendicular to the Z-axis and the Y-axis (straight line perpendicular to the plane of the drawing sheet of FIG. 3)

Also, to represent the surface shape of the ith surface constituting the optical system, it is easier to understand in recognizing the shape to set a local coordinate system having as the origin the point at which the reference axis and the ith surface intersect with each other, and represent the surface shape of that surface by the local coordinate system than to represent the shape of that surface by an absolute coordinate system and therefore, in the embodiments wherein the construction data of the present invention are displayed, the surface shape of the ith surface is represented by the local coordinate system.

Also, the angle of tilt of the ith surface in YZ plane is represented by an angle $\theta i$ (unit being °) in which the counter-clockwise direction relative to the Z-axis of an absolute coordinate system is positive. Consequently, in the embodiments of the present invention, the origin of the local coordinates of each surface lies on the YZ plane in FIG. 3. There are no tilt and shift of the surfaces in the XZ and XY planes. Further, the y- and z-axis of the local coordinates (x, y, z) of the ith surface are inclined by an angle $\theta i$ in YZ plane relative to the absolute coordinate system (X, Y, Z) and specifically are set as follows:

z-axis: straight line passing through the origin of the local coordinates and counter-clockwisely forming an angle $\theta i$ in the YZ plane relative to the Z direction of the absolute coordinate system y-axis: straight line passing through the origin of the local coordinates and counter-clockwisely forming 90° in the YZ plane relative to Z direction x-axis: straight line passing through the origin of the local coordinates and perpendicular to the YZ plane Also, Di is a scalar amount representative of the interval between the origins of the local coordinates of the ith surface and the (i+1)th surface, and Ndi and vdi are the refractive index and Abbe number, respectively, of the medium between the ith surface and the (i+1)th surface.

The embodiments of the present invention have a spherical surface and a rotation-asymmetrical aspherical surface. The spherical portion thereof has its radius of curvature $r_i$ described as a spherical shape. The sign of the radius of curvature $r_i$ is plus when the center of curvature is in the plus direction of the z-axis of the local coordinates, and is minus when the center of curvature is in the minus direction of the z-axis.

Here, the spherical surface is of a shape represented by the following expression:

$$Z = \frac{(x^2+y^2)/r_i}{1+\{1-(x^2+y^2)/r_i^2\}^{1/2}}$$

Also, the optical system of the present invention has at least one rotation-asymmetrical aspherical surface, the shape of which is represented by the following expressions:

$$A = (a+b)\cdot(y^2\cdot\cos^2 t + x^2)$$

$$B = 2a\cdot b\cdot\cos t[1+\{(b-a)\cdot y\cdot\sin t/(2a\cdot b)\} + \\ [1+\{(b-a)\cdot y\cdot\sin t/(a\cdot b)\} - \{y^2/(a\cdot b)\} - \\ \{4a\cdot b\cdot\cos^2 t + (a+b)^2\sin^2 t\}x^2/(4a^2b^2\cos^2 t)]^{1/2}]$$

Assuming so, $$Z=A/B+C_{02}y^2+C_{20}x^2+C_{03}y^3+Cx_{21}x^2y+C_{04}y^4+C_{22}x^2y^2+C_{40}x^4+$$

The above curved surface expression has only terms of even number order with respect to X and therefore, the curved surface prescribed by the above curved surface expression is of a plane-symmetrical shape having the yz plane as a symmetrical plane. Further, when the following condition is satisfied, it represents a shape symmetrical with respect to xz plane.

$$C_{03}=C_{21}=C_{05}=C_{23}=C_{41}=t=0$$

Further, when $$C_{02}=C_{20}, \ C_{04}=C_{40}=C_{22}/2$$

are satisfied, it represents a rotation-symmetrical shape. When the above conditions are not satisfied, it is a rotation-asymmetrical shape.

Also, a horizontal half angle of view us is the maximum angle of view of a light beam incident on the first surface RI in YZ plane of FIG. 3, and a vertical half angle of view u. is the maximum angle of view of a light beam incident on the first surface R1 in XZ plane.

Also, as what indicates the brightness of the optical system, the diameter of the entrance pupil is shown as the entrance pupil diameter. Also, the effective image range on the image surface is shown as the image size. The image size is represented by a rectangular area in which the size in y direction of the local coordinates is horizontal and the size in x direction thereof is vertical.

Also, regarding the embodiments of which the construction data are mentioned, the lateral aberrations thereof are shown. The lateral aberration graph shows the lateral aberration of an angle of incidence in which about the states of the wide angle end (W), the medium position (M) and the telephoto end (T) of each embodiment, the horizontal angle of incidence and the vertical angle of incidence onto the stop R1 are $(u_y, u_x)$, $(0, u_x)$, $(-u_y, u_x)$, $(u_y, 0)$, $(0, 0)$ and $(-u_y, 0)$, respectively. In the lateral aberration graph, the axis of abscissas represents the height of incidence onto the pupil, and the axis of ordinates represents the amount of aberration. Each embodiment is of a plane-symmetrical shape in which basically each surface has the yz plane as a symmetrical plane and therefore, even in the lateral aberration graph, the plus and minus directions of the vertical angle of view are the same directions and therefore, for the simplification of showing, the lateral aberration graph in the minus direction is omitted.

The converted principal point intervals (or converted intervals) $e_1$ and $e_2$ in each embodiment are measured on the reference axis, and when the object side principal point position of the next lens unit (or the reference point of the next surface) is more adjacent to the image side than the image side principal point position of the said lens unit (or the reference point of the said surface), it is positive, and when the said object side principal position (or the said reference point) is more adjacent to the object side than the said image side principal point position, it is negative.

The embodiments will hereinafter be described.

[Embodiment 1]

Figure 4:
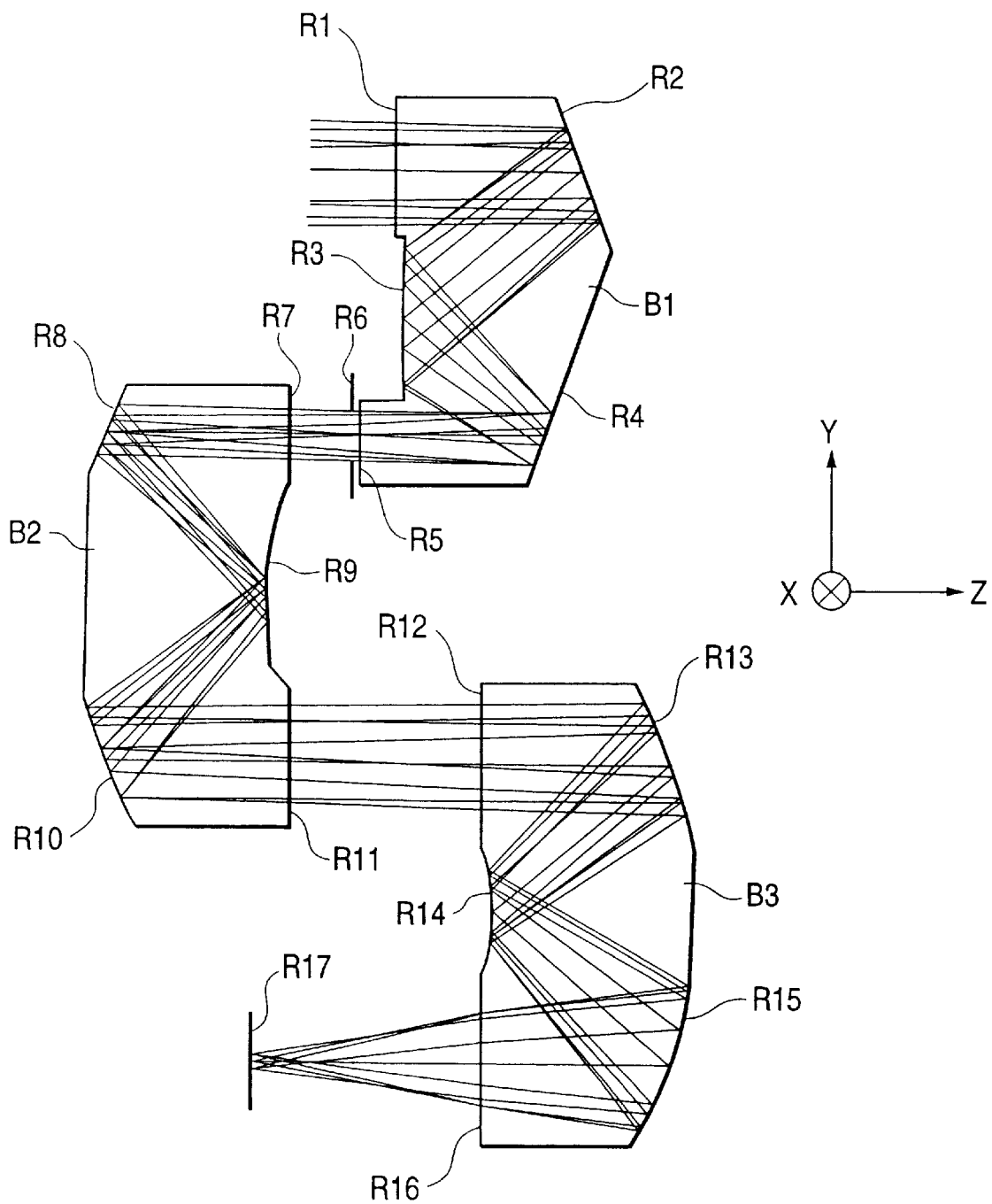
FIG. 4 is a cross-sectional view of Embodiment 1 of the optical system of the present invention.

Embodiment 1 is an optical system comprising three blocks each having a plurality of off-axial curved reflecting surfaces. FIG. 4 shows a cross-sectional view of the optical system. In FIG. 4, an optical path is also shown.

| | | horizontal half angle of view 1.6 (deg) vertical half angle of view 1.2 (deg) diameter of the stop 2.00 | | | | | |
|---|---|---|---|---|---|---|---|
| i | Yi | Zi | θi | Di | Ndi | νdi | |
| | | | first lens unit B1 | | | | |
| 1 | 0.00 | 0.00 | 0.00 | 8.00 | 1.51633 | 64.15 | refracting surface |
| 2 | 0.00 | 8.00 | 20.00 | 10.00 | 1.51633 | 64.15 | reflecting surface |
| 3 | −6.43 | 0.34 | 0.00 | 8.00 | 1.51633 | 64.15 | reflecting surface |
| 4 | −11.57 | 6.47 | −20.00 | 8.00 | 1.51633 | 64.15 | reflecting surface |
| 5 | −11.57 | −1.53 | 0.00 | 0.10 | 1 | | refracting surface |
| 6 | −11.57 | −1.63 | 0.00 | 3.00 | 1 | | stop |
| | | | second lens unit B2 | | | | |
| 7 | −11.57 | −4.63 | 0.00 | 8.00 | 1.51633 | 64.15 | refracting surface |
| 8 | −11.57 | −12.63 | −22.50 | 10.00 | 1.51633 | 64.15 | reflecting surface |
| 9 | −18.64 | −5.56 | 0.00 | 10.00 | 1.51633 | 64.15 | reflecting surface |
| 10 | −25.71 | −12.63 | 22.50 | 8.00 | 1.51633 | 64.15 | reflecting surface |
| 11 | −25.71 | −4.63 | 0.00 | 8.65 | 1 | | refracting surface |
| | | | third lens unit B3 | | | | |
| 12 | −25.71 | 4.02 | 0.00 | 8.00 | 1.51633 | 64.15 | refracting surface |
| 13 | −25.71 | 12.02 | 20.00 | 10.00 | 1.51633 | 64.15 | reflecting surface |
| 14 | −32.14 | 4.36 | 0.00 | 10.00 | 1.51633 | 64.15 | reflecting surface |
| 15 | −38.57 | 12.02 | −20.00 | 8.00 | 1.51633 | 64.15 | reflecting surface |
| 16 | −38.57 | 4.02 | 0.00 | 10.16 | 1 | | refracting surface |
| 17 | −38.57 | −6.14 | −0.00 | | 1 | | image surface |

| spherical shape | |
|---|---|
| surface R1 | $r_1 = \infty$ |
| surface R5 | $r_5 = \infty$ |
| surface R7 | $r_7 = \infty$ |
| surface R11 | $r_{11} = \infty$ |
| surface R12 | $r_{12} = \infty$ |
| surface R16 | $r_{16} = \infty$ |

| aspherical shape | | | |
|---|---|---|---|
| surface R2 | a = 6.81549e + 00 | b = −7.89043e + 00 | t = 6.00000e + 01 |
| | $C_{03}$ = 7.16845e − 04 | $C_{21}$ = 2.71209e − 03 | $C_{40}$ = 1.50312e − 05 |
| | $C_{04}$ = 2.10844e − 04 | $C_{22}$ = −1.34148e − 04 | |
| surface R3 | a = 1.98526e + 01 | b = 4.24091e + 01 | t = −4.00000e + 01 |
| | $C_{03}$ = −8.98849e − 05 | $C_{21}$ = −3.39323e − 04 | $C_{40}$ = −5.60043e − 05 |
| | $C_{04}$ = 2.60319e − 05 | $C_{22}$ = −2.0715e − 04 | |
| surface R4 | a = 5.62780e + 01 | b = 1.34461e + 01 | t = 2.00000e + 01 |
| | $C_{03}$ = 1.83683e − 03 | $C_{21}$ = −6.38730e − 03 | $C_{40}$ = −3.59341e − 05 |
| | $C_{04}$ = 1.57580e − 04 | $C_{22}$ = −1.76026e − 03 | |

-continued

| | | | |
|---|---|---|---|
| surface R8 | a = 1.08024e + 01 | b = −4.25300e + 01 | t = −2.25000e + 01 |
| | $C_{03}$ = 1.82196e − 04 | $C_{21}$ = −1.11120e − 03 | $C_{40}$ = −6.47978e − 05 |
| | $C_{04}$ = 4.25581e − 04 | $C_{22}$ = −4.90896e − 05 | |
| surface R9 | a = −4.84902e + 01 | b = 5.87721e + 00 | t = 4.50000e + 01 |
| | $C_{03}$ = 3.48240e − 04 | $C_{21}$ = 6.27055e − 03 | $C_{40}$ = −1.39629e − 03 |
| | $C_{04}$ = −2.15537e − 04 | $C_{22}$ = 1.79446e − 03 | |
| surface R10 | a = 1.72054e + 01 | b = 1.97489e + 02 | t = −2.25000e + 01 |
| | $C_{03}$ = 1.64141e − 04 | $C_{21}$ = 2.07271e − 03 | $C_{40}$ = −6.50863e − 05 |
| | $C_{04}$ = −1.52912e − 05 | $C_{22}$ = −1.85738e − 04 | |
| surface R13 | a = 1.52794e + 01 | b = −8.45017e + 00 | t = 2.00000e + 01 |
| | $C_{03}$ = −1.26682e − 04 | $C_{21}$ = 2.23683e − 03 | $C_{40}$ = 6.21866e − 04 |
| | $C_{04}$ = −1.10254e − 04 | $C_{22}$ = 1.91105e − 04 | |
| surface R14 | a = −8.05019e + 00 | b = −8.08126e + 00 | t = −4.00000e + 01 |
| | $C_{03}$ = 1.58140e − 03 | $C_{21}$ = 2.55688e − 03 | $C_{40}$ = 1.37863e − 03 |
| | $C_{04}$ = −9.64042e − 04 | $C_{22}$ = −9.37736e − 04 | |
| surface R15 | a = 1.68072e + 01 | b = −1.93389e + 01 | t = 2.70591e + 01 |
| | $C_{03}$ = 2.11554e − 04 | $C_{21}$ = 1.86617e − 05 | $C_{40}$ = 1.68242e − 05 |
| | $C_{04}$ = −3.62955e − 05 | $C_{22}$ = −2.57248e − 05 | |

In this embodiment, the optical system is comprised of three lens units (partial systems). The first lens unit (the first partial system) comprises a flat entrance refracting surface R1 and a flat exit refracting surface R5 and three off-axial curved reflecting surfaces R2, R3 and R4 formed on a transparent block. R6 designates a stop.

The second lens unit (the second partial system) comprises a flat entrance refracting surface R7 and a flat exit refracting surface R11 and three off-axial curved reflecting surfaces R8, R9 and R10 formed on a transparent block. All the surfaces constituting the second lens unit B2 are isotropic surfaces and therefore, as the whole second lens unit B2, the power (refractive power) and the principal point position are both constant irrespective of the azimuth.

The third lens unit (the third partial system) comprises a flat entrance refracting surface R12 and a flat exit refracting surface R16 and three off-axial curved reflecting surfaces R13, R14 and R15 formed on a transparent block. R17 denotes an image surface.

The power $\phi_2$ of the second lens unit B2 in the present embodiment is $$\phi_2 = 0.042369$$

and on the other hand, the converted principal point intervals $e_1$ and $e_2$ among the lens units are 44.553 and 68.724 and therefore, $$(e_1 + e_2)/(e_1 * e_2) = 0.036996$$

and the deviation from $\phi_2$ is about 13% and this substantially satisfies expression (1).

This means that the vicinity of the image side principal point $\Delta_1'$ of the first lens unit B1 and the vicinity of the object side principal point $\Delta_3$ of the third lens unit B3 are in a conjugate relation and when the object point is put near the image side principal point position $\Delta_1'$ of the first lens unit B1, the image point is formed near the object side principal point position $\Delta_3$ of the third lens unit B3.

Now, considering the power of a reflecting surface in which $C_{11} = 0$ as in this example, (numerical expression 10) is deformed and from N′=−N, θ′=−θ and $C_{11}=0$, said power is represented as $$\phi(\xi) = -4N\{C_{20} * \cos^2(\xi)/\cos(\theta) + C_{02} * \sin^2(\xi) * \cos(\theta)\}.$$

Here, when attention is paid to only the dependency on the azimuth ξ, the above expression can be rewritten into $$\phi(\xi) = A + B \cos(2\xi),$$

where $A = -2N\{C_{20}/\cos(\theta) + C_{02} * \cos(\theta)\}$ $$B = -2N\{C_{20}/\cos(\theta) - C_{02} * \cos(\theta)\}.$$

That is, the power of the off-axial reflecting surface describes a cosine curve of the average value A, an amplitude B and A period π relative to the azimuth ξ.

Also, the composite power of a plurality of surfaces is represented by the product and sum of the powers of the respective surfaces, and at that time, a term proportional to $\cos(n\xi)$ ($n \geq 4$) is created. However, these high-order terms of the azimuth ξ are minute and therefore, what governs the azimuth dependency of power is a term proportional to $\cos(2\xi)$.

Accordingly, when the dependency of the entire system is to be compensated for by groups having azimuth dependency, the power of the group may be considered to be $$\phi = A + B \cos(2\xi).$$

So, the azimuth dependency of the powers of the first lens unit B1 and the third lens unit B3 is $$\phi_1(\xi) = 0.00485 + 0.02805 \cos(2\xi)$$

$$\phi_3(\xi) = 0.09055 - 0.01005 \cos(2\xi)$$

and $$(e_1/e_2)^2 = 0.42028$$

and therefore, the right side of expression (2) is $$-0.0020384 - 0.01178 \cos(2\xi) + c$$

and therefore, assuming that c=0.108176, the deviation from $\phi_3(\xi)$ is about 15%, and this substantially satisfies expression (2).

Figure 5A:
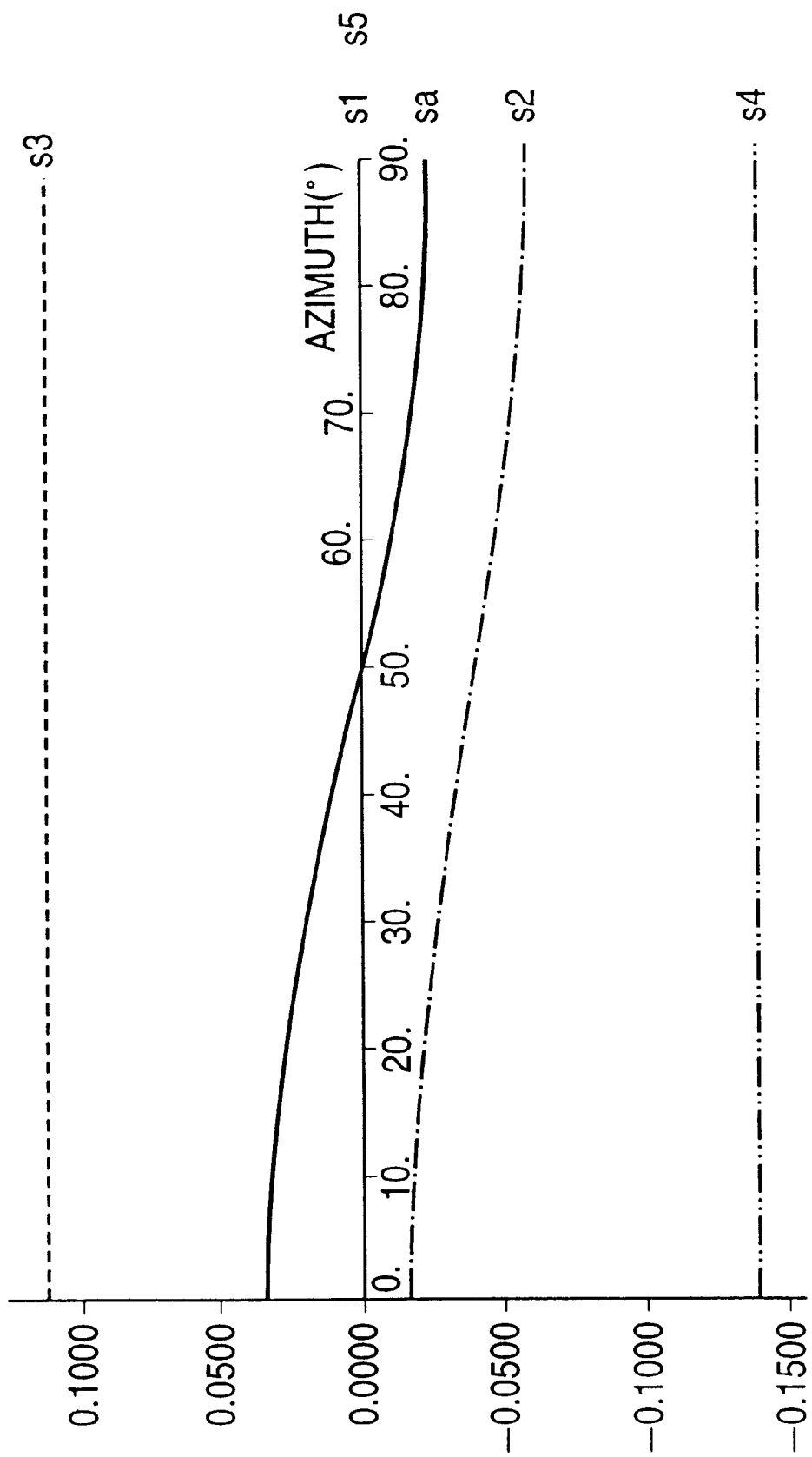
Figure 5C:
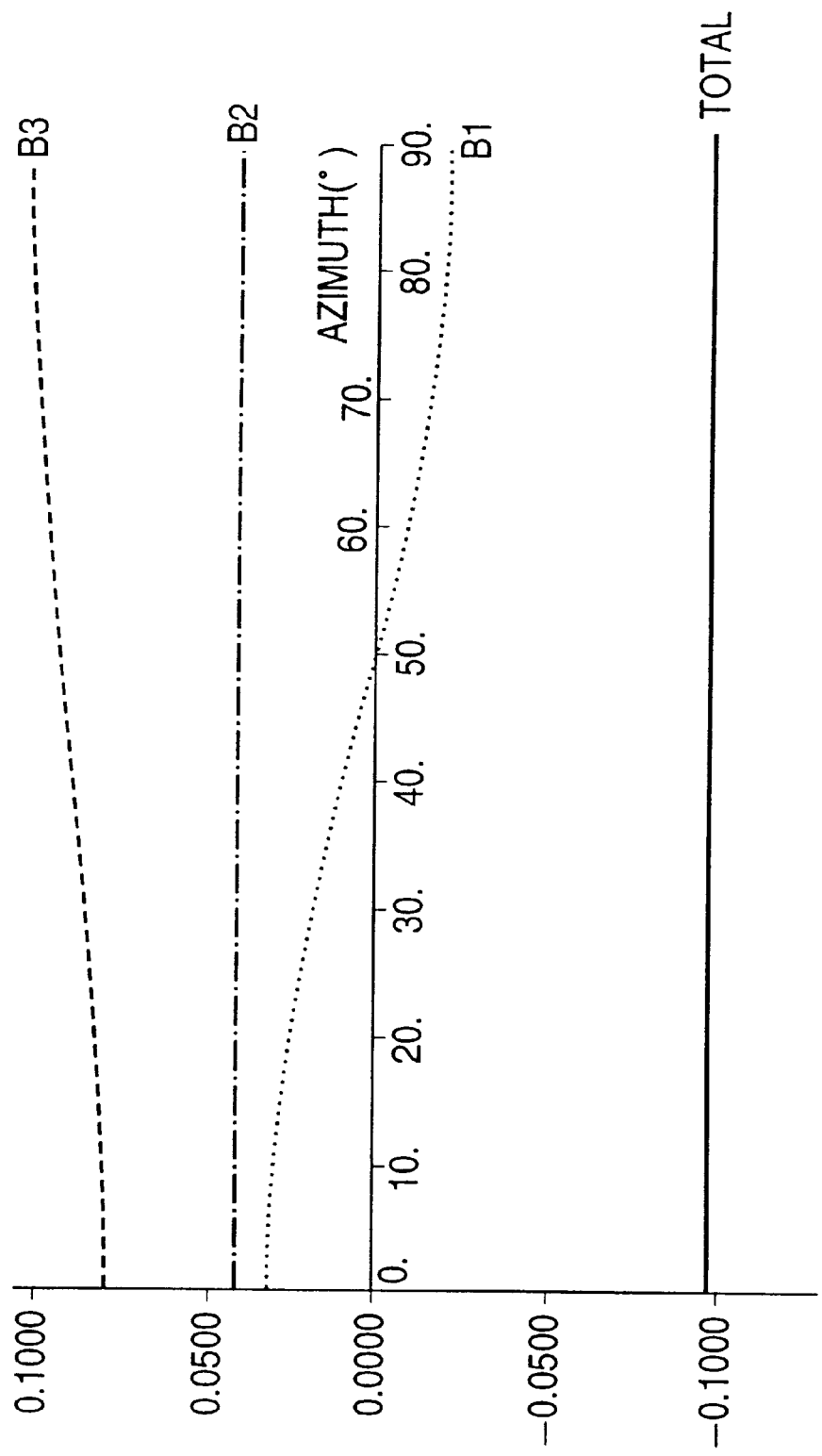

The azimuth dependency of the power of each lens unit and the power of the entire system is shown in FIGS. 5A to 5C. FIG. 5A is a graph of the azimuth dependency of the first lens unit B1. In FIG. 5A, the axis of abscissas represents the azimuth (°) and the axis of ordinates represents the power. Also, si indicates that the ith surface is a curve, and sa indicates the curve of the composite power of the entire system. FIG. 5B is a graph of the azimuth dependency of the third lens unit B3. Also, FIG. 5C is a graph of the azimuth dependency of the power of each lens unit and the entire system. In the first lens unit B1 and the third lens unit B3, the azimuth dependency of the power occurs, but in the entire system, the dependency is compensated for so as to become smaller.

Figure 6:
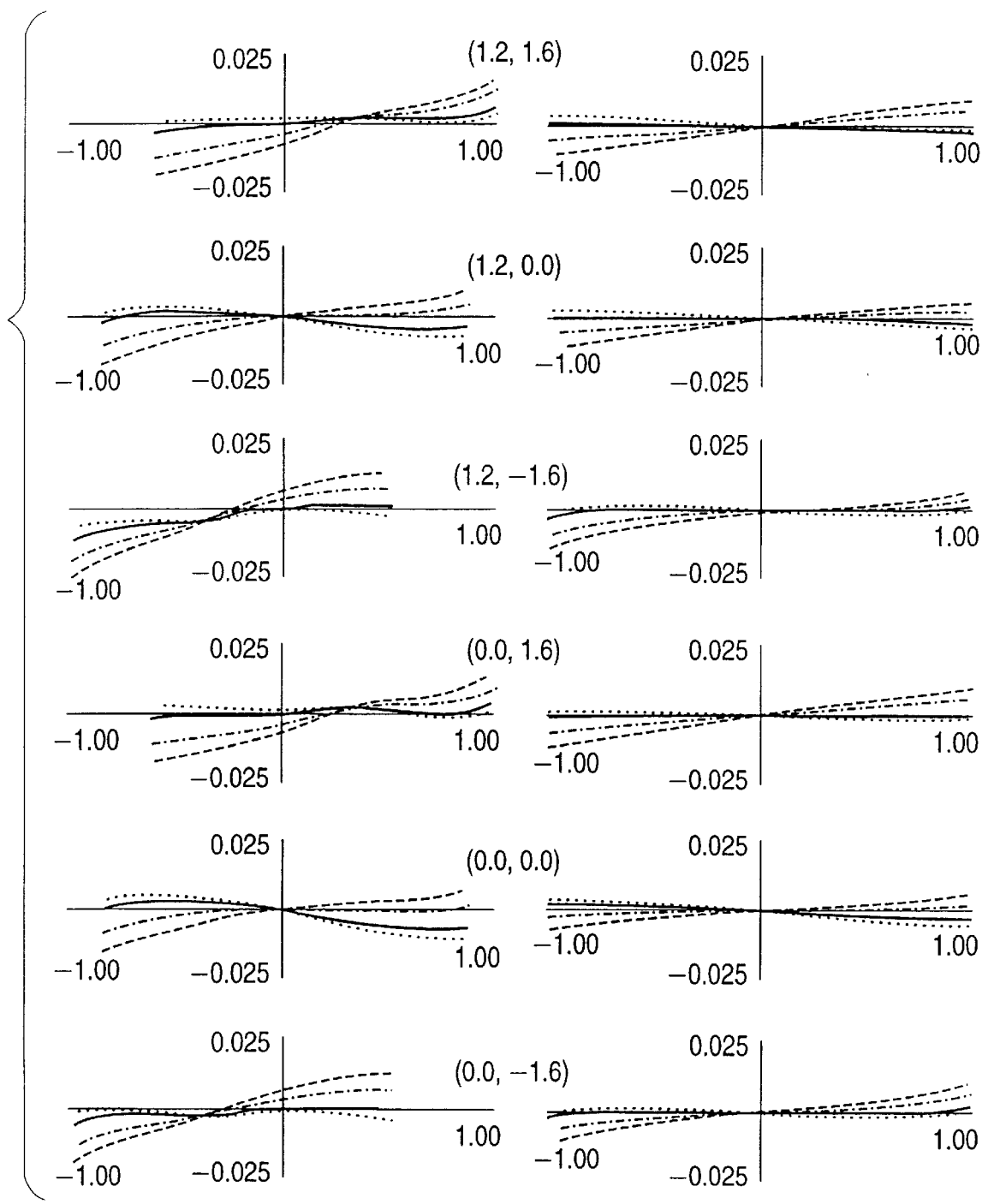
FIG. 6 shows the lateral aberration of Embodiment 1.

Also, the lateral aberration of the present embodiment is shown in FIG. 6. As can be seen from this figure, the image surface positions coincide well with each other, and it is seen that astigmatism does not occur on the axis.

[Embodiment 2]

Figure 7:
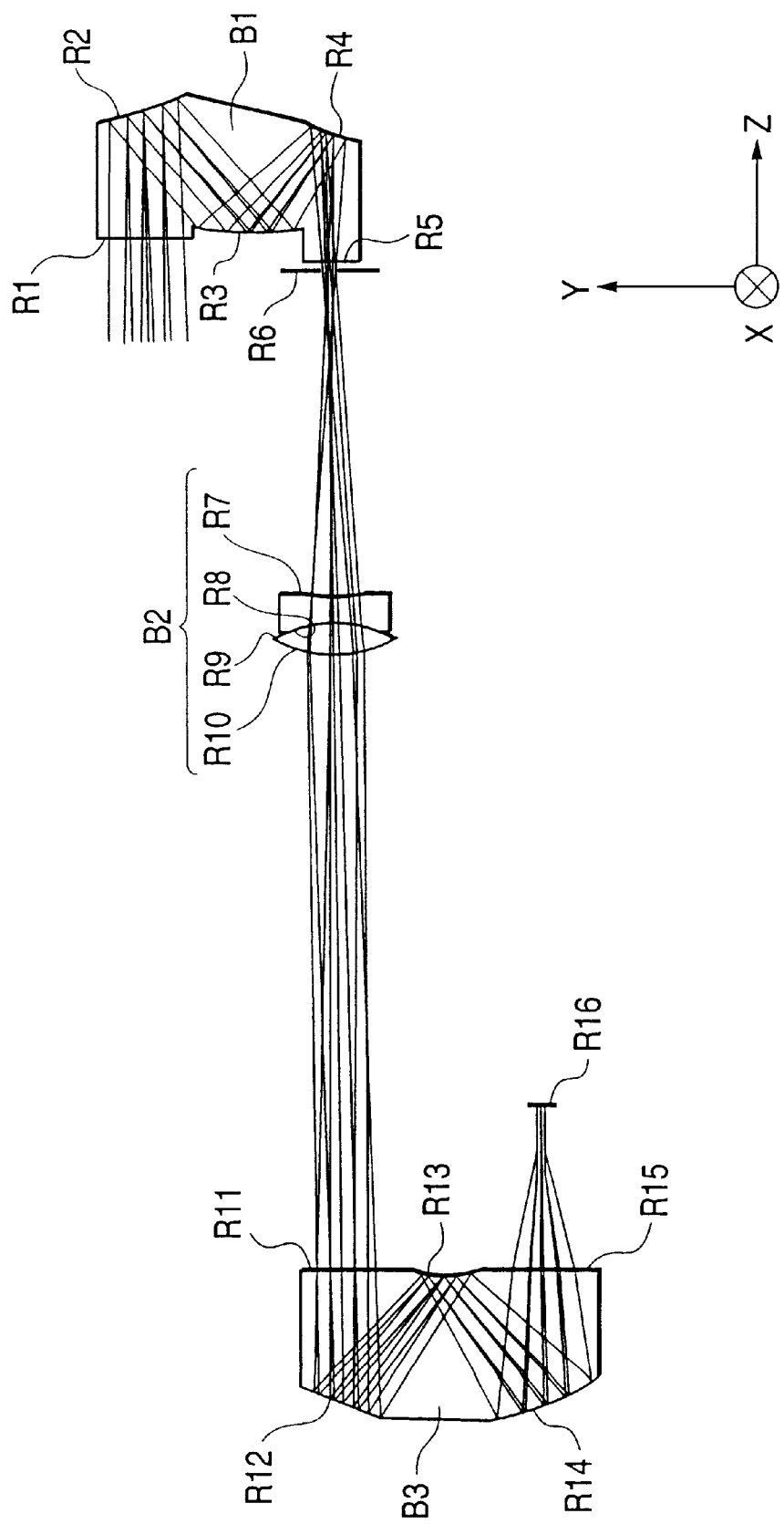
FIG. 7 is a cross-sectional view of Embodiment 2 of the optical system of the present invention.

Embodiment 2 is an optical system comprising two blocks each having a plurality of off-axial curved reflecting surfaces, and a lens unit constituted by a plurality of refracting lenses. FIG. 7 shows a cross-sectional view of the optical system. An optical path is also shown in the figure.

| | | horizontal half angle of view 1.6 (deg) vertical half angle of view 1.2 (deg) diameter of the stop 2.00 | | | | | |
|---|---|---|---|---|---|---|---|
| i | Yi | Zi | θi | Di | Ndi | νdi | |
| | | | first lens unit B1 | | | | |
| 1 | 0.00 | 0.00 | 0.00 | 8.00 | 1.51633 | 64.15 | refracting surface |
| 2 | 0.00 | 8.00 | 20.00 | 10.00 | 1.51633 | 64.15 | reflecting surface |
| 3 | −6.43 | 0.34 | 0.00 | 8.00 | 1.51633 | 64.15 | reflecting surface |
| 4 | −11.57 | 6.47 | −20.00 | 8.00 | 1.51633 | 64.15 | reflecting surface |
| 5 | −11.57 | −1.53 | 0.00 | 0.10 | 1 | | refracting surface |
| 6 | −11.57 | −1.63 | 0.00 | 20.96 | 1 | | stop |
| | | | second lens unit B2 | | | | |
| 7 | −11.57 | −22.59 | 0.00 | 1.54 | 1.64208 | 34.65 | refracting surface |
| 8 | −11.57 | −24.13 | 0.00 | 0.22 | 1 | | refracting surface |
| 9 | −11.57 | −24.35 | 0.00 | 1.80 | 1.71144 | 47.51 | refracting surface |
| 10 | −11.57 | −26.15 | 0.00 | 38.33 | 1 | | refracting surface |
| | | | third lens unit B3 | | | | |
| 11 | −11.57 | −64.49 | 0.00 | 8.00 | 1.51633 | 64.15 | refracting surface |
| 12 | −11.57 | −72.49 | −20.00 | 10.00 | 1.51633 | 64.15 | reflecting surface |
| 13 | −18.00 | −64.82 | 0.00 | 10.00 | 1.51633 | 64.15 | reflecting surface |
| 14 | −24.43 | −72.49 | 20.00 | 8.00 | 1.51633 | 64.15 | reflecting surface |
| 15 | −24.43 | −64.49 | 0.00 | 10.16 | 1 | | refracting surface |
| 16 | −24.43 | −54.33 | 0.00 | | 1 | | image surface |

| spherical shape | |
|---|---|
| surface R1 | $r_1 = \infty$ |
| surface R5 | $r_5 = \infty$ |
| surface R7 | $r_7 = 16.140$ |
| surface R8 | $r_8 = -6.551$ |
| surface R9 | $r_9 = -7.464$ |
| surface R10 | $r_{10} = 9.653$ |
| surface R11 | $r_{11} = \infty$ |
| surface R15 | $r_{15} = \infty$ |

| aspherical shape | | | |
|---|---|---|---|
| surface R2 | $a = 6.81549e + 00$ | $b = -7.89043e + 00$ | $t = 6.00000e + 01$ |
| | $C_{03} = 7.42025e - 04$ | $C_{21} = 2.63704e - 03$ | $C_{40} = 4.49592e - 04$ |
| | $C_{04} = 2.70218e - 04$ | $C_{22} = -6.64464e - 04$ | |
| surface R3 | $a = 1.98526e + 01$ | $b = 4.24091e + 01$ | $t = -4.00000e + 01$ |
| | $C_{03} = 1.52679e - 05$ | $C_{21} = 2.12196e - 03$ | $C_{40} = 1.16237e - 04$ |
| | $C_{04} = 1.15757e - 05$ | $C_{22} = -2.88638e - 04$ | |
| surface R4 | $a = 5.62780e + 01$ | $b = 1.34461e + 01$ | $t = 2.00000e + 01$ |
| | $C_{03} = 2.98248e - 04$ | $C_{21} = 6.68979e - 03$ | $C_{40} = 3.35577e - 04$ |
| | $C_{04} = 2.17474e - 04$ | $C_{22} = -3.29723e - 04$ | |
| surface R12 | $a = -1.52794e + 01$ | $b = 8.45017e + 00$ | $t = 2.00000e + 01$ |
| | $C_{03} = -3.41641e - 04$ | $C_{21} = 1.38022e - 03$ | $C_{40} = -4.60122e - 04$ |
| | $C_{04} = 6.66019e - 05$ | $C_{22} = -1.99778e - 05$ | |

-continued horizontal half angle of view 1.6 (deg)
vertical half angle of view 1.2 (deg)
diameter of the stop 2.00

| | | | |
|---|---|---|---|
| surface R13 | a = 8.05019e + 00 | b = 8.08126e + 00 | t = −4.00000e + 01 |
| | $C_{03}$ = 1.59993e − 03 | $C_{21}$ = 3.11193e − 03 | $C_{40}$ = −4.21818e − 03 |
| | $C_{04}$ = 8.30049e − 04 | $C_{22}$ = −2.31826e − 03 | |
| surface R14 | a = 1.68072e + 01 | b = 1.93389e + 01 | t = 2.70591e + 01 |
| | $C_{03}$ = 1.61569e − 04 | $C_{21}$ = 1.46423e − 04 | $C_{40}$ = −8.37994e − 06 |
| | $C_{04}$ = 5.90213e − 05 | $C_{22}$ = −1.07229e − 04 | |

In this embodiment, the optical system is comprised of three lens units (partial systems). The first lens unit (the first partial system) B1 comprises a flat entrance refracting surface R1 and a flat exit refracting surface R5 and three off-axial curved reflecting surfaces R2, R3 and R4 formed on a transparent block. R6 designates a stop.

The second lens unit (the second partial system) B2 comprises a concave lens comprised of the seventh surface R7 and the eighth surface R8, and a convex lens comprised of the ninth surface R9 and the tenth surface R10. These surfaces are all spherical surfaces and therefore are all isotropic surfaces, and as the whole of the second lens unit B2, the power and the principal point position are both constant irrespective of the azimuth.

The third lens unit (the third partial system) B3 comprises a flat entrance refracting surface R11 and a flat exit refracting surface R15 and three off-axial curved reflecting surfaces R12, R13 and R14 formed on a transparent block. R16 denotes the image surface.

The composite power $\phi_2$ of the second lens unit B2 in the present embodiment is $\phi_2 = 0.042210$ and on the other hand, the converted principal point intervals $e_1$ and $e_2$ among the lens units are 44.741 and 68.847, respectively and therefore, $(e_1 + e_2)/(e_1 * e_2) = 0.036876$, thus substantially satisfying expression (1).

Also, the azimuth dependency of the power of the first lens unit B1 and the third lens unit B3 is $\phi_1(\xi) = 0.00485 + 0.02805\cos(2\xi)$ $\phi_3(\xi) = 0.09055 - 0.01005\cos(2\xi)$ $(e_1/e_2)^2 = 0.42232$ and this substantially satisfies expression (2).

Figure 8A:
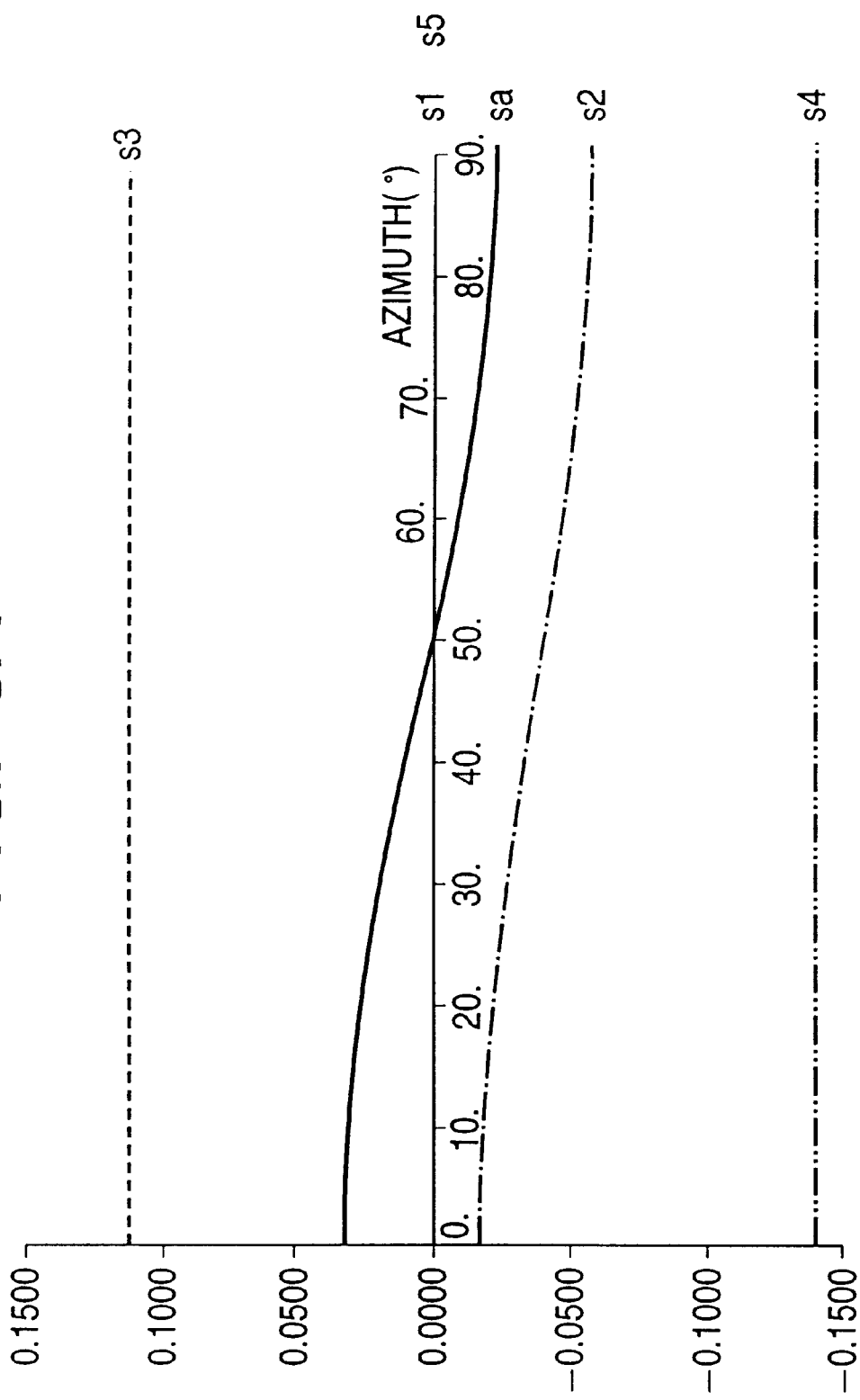

The azimuth dependency of the power of each lens unit and the power of the entire system is shown in FIGS. 8A to 8C. FIG. 8A is a graph of the azimuth dependency of the first lens unit B1. FIG. 8B is a graph of the azimuth dependency of the third lens unit B3. Also, FIG. 8C is a graph of the azimuth dependency of each lens unit and the entire system. The azimuth dependency of power occurs in the first lens unit B1 and the third lens unit B3, but in the entire system, the dependency is compensated for so as to become smaller.

Figure 9:
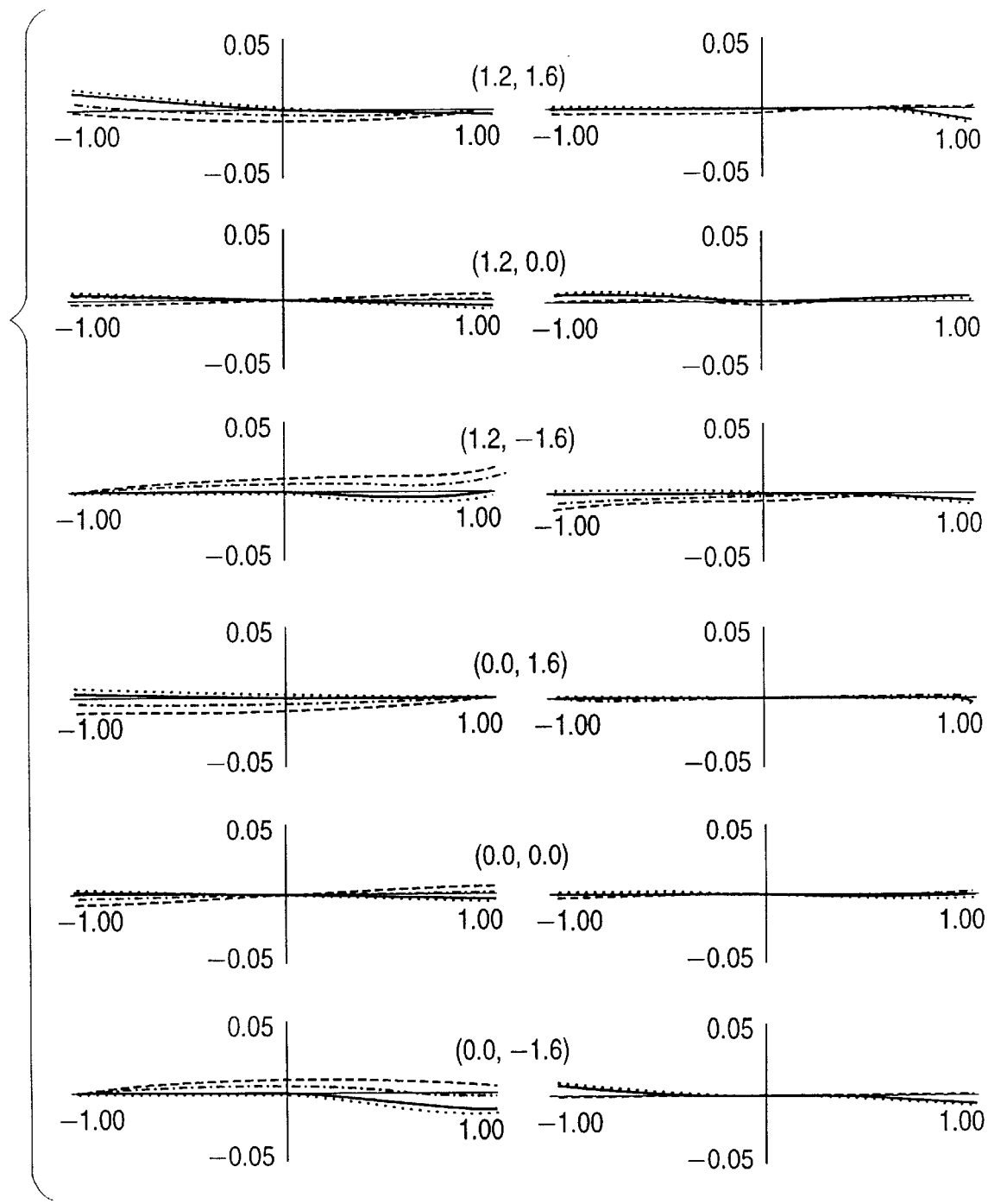
FIG. 9 shows the lateral aberration of Embodiment 2.

Also, the lateral aberration of the present embodiment is shown in FIG. 9. As can be seen from the figure, the image surface positions coincide well with each other, and it is seen that astigmatism does not occur on the axis.

[Embodiment 3]

Figure 10:
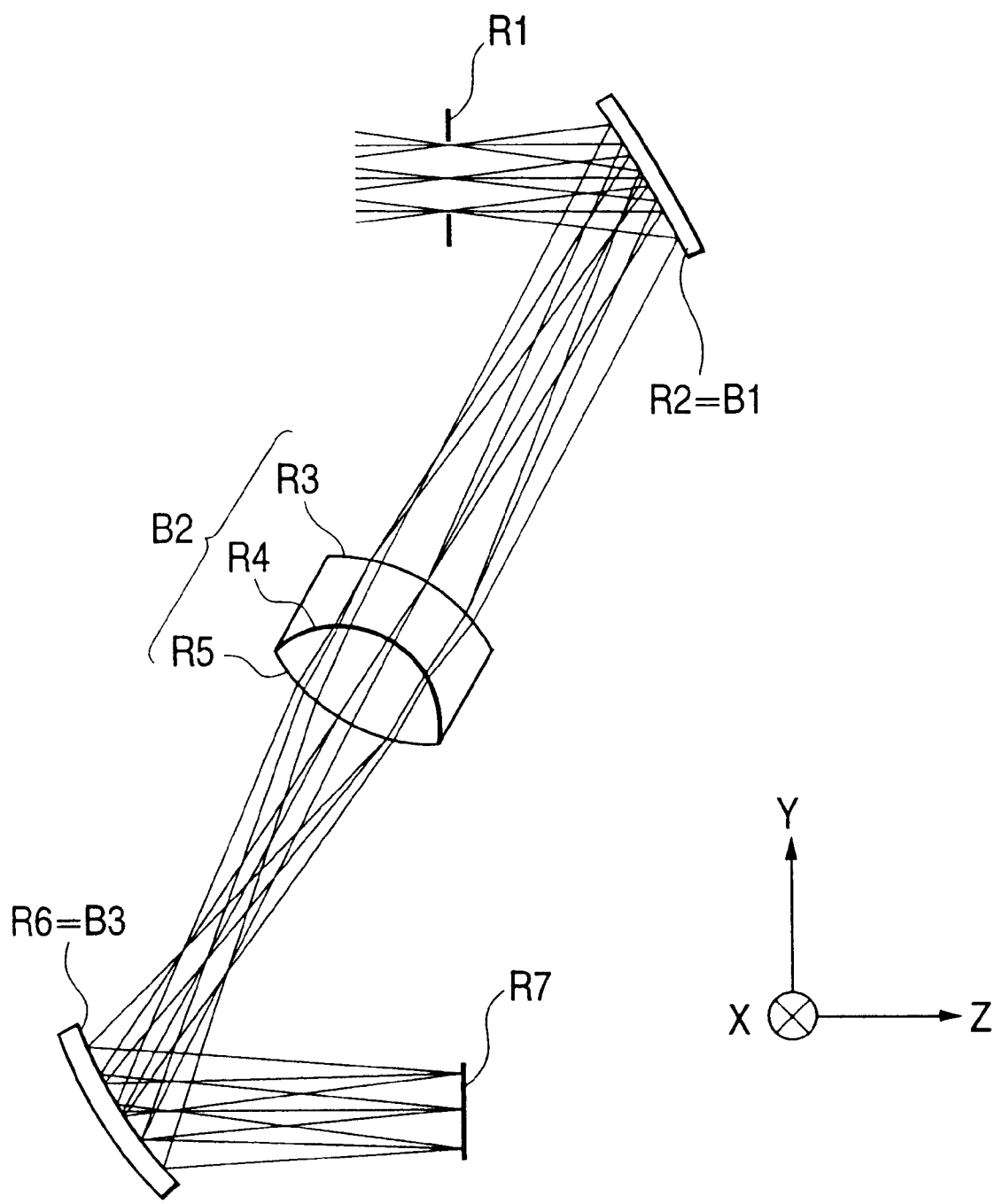
FIG. 10 is a cross-sectional view of Embodiment 3 of the optical system of the present invention.

Embodiment 3 is an optical system comprising two blocks each comprising an off-axial curved reflecting surface and a lens unit comprised of a plurality of refracting lenses. FIG. 10 shows a cross-sectional view of the optical system. An optical path is also shown in FIG. 10.

horizontal half angle of view 6.6 (deg)
vertical half angle of view 4.9 (deg)
diameter of the stop 1.60

| i | $Y_i$ | $Z_i$ | $\theta_i$ | $D_i$ | $N_{di}$ | $\nu_{di}$ | |
|---|---|---|---|---|---|---|---|
| 1 | 0.00 | 0.00 | 0.00 | 5.00 | 1 | | stop |
| | | | | first lens unit B1 | | | |
| 2 | 0.00 | 5.00 | 30.00 | 11.37 | 1 | | reflecting surface |
| | | | | second lens unit B2 | | | |
| 3 | −9.84 | −0.68 | 60.00 | 1.66 | 1.74678 | 31.25 | refracting surface |
| 4 | −11.28 | −1.51 | 60.00 | 2.20 | 1.50577 | 68.41 | refracting surface |
| 5 | −13.18 | −2.61 | 60.00 | 11.08 | 1 | | refracting surface |
| | | | | third lens unit B3 | | | |
| 6 | −22.78 | −8.15 | 30.00 | 8.41 | 1 | | reflecting surface |
| 7 | −22.78 | 0.26 | −0.00 | | 1 | | image surface | spherical shape

| | |
|---|---|
| surface R3 | $r_3$ = −4.647 |
| surface R4 | $r_4$ = −2.420 |
| surface R5 | $r_5$ = 4.532 | aspherical shape

| | | | |
|---|---|---|---|
| surface R2 | $C_{02}$ = −1.89750e − 02 | $C_{20}$ = −4.00000e − 02 | $C_{40}$ = 7.31818e − 05 |
| | $C_{03}$ = −1.51026e − 03 | $C_{21}$ = 1.94211e − 03 | |
| | $C_{04}$ = −1.58365e − 05 | $C_{22}$ = −4.85221e − 04 | |
| surface R6 | $C_{02}$ = 4.08507e − 02 | $C_{20}$ = 4.02419e − 02 | $C_{40}$ = 1.33364e − 04 |
| | $C_{03}$ = 1.58961e − 03 | $C_{21}$ = −1.49390e − 03 | |
| | $C_{04}$ = 2.04323e − 04 | $C_{22}$ = −1.19089e − 04 | |

In this embodiment, the optical system is comprised of three lens units (partial systems). The first surface R1 is a stop. The first lens unit (the first partial system) B1 comprises an off-axial curved reflecting surface R2.

The second lens unit (the second partial system) B2 comprises a refracting lens system comprising a concave lens comprised of the third surface R3 and the fourth surface R4 and a convex lens comprised of the fourth surface R4 and the fifth surface R5, the concave lens and the convex lens being cemented together. These surfaces are all spherical surfaces and therefore are all isotropic surfaces, and as the whole of the second lens unit B2, the power and the principal point position are both constant irrespective of the azimuth.

The third lens unit (the third partial system) B3 comprises an off-axial curved reflecting surface R6. R7 designates the image surface.

The power $\phi_2$ of the second lens unit B2 in the present embodiment is $\phi_2=0.1584$ and on the other hand, the converted principal point intervals $e_1$ and $e_2$ among the lens units are 12.565 and 12.746, respectively, and therefore $(e_1+e_2)/(e_1*e_2)=0.1580$ and this substantially satisfies expression (1).

Also, the azimuth dependency of the powers of the first lens unit B1 and the third lens unit B3 is $\phi_1(\xi) = 0.1131 - 0.02546\cos(2\xi)$ $\phi_3(\xi) = 0.16404 + 0.02464\cos(2\xi)$ $(e_1/e_2)^2 = 0.9718$ and this substantially satisfies expression (2).

Figure 11:
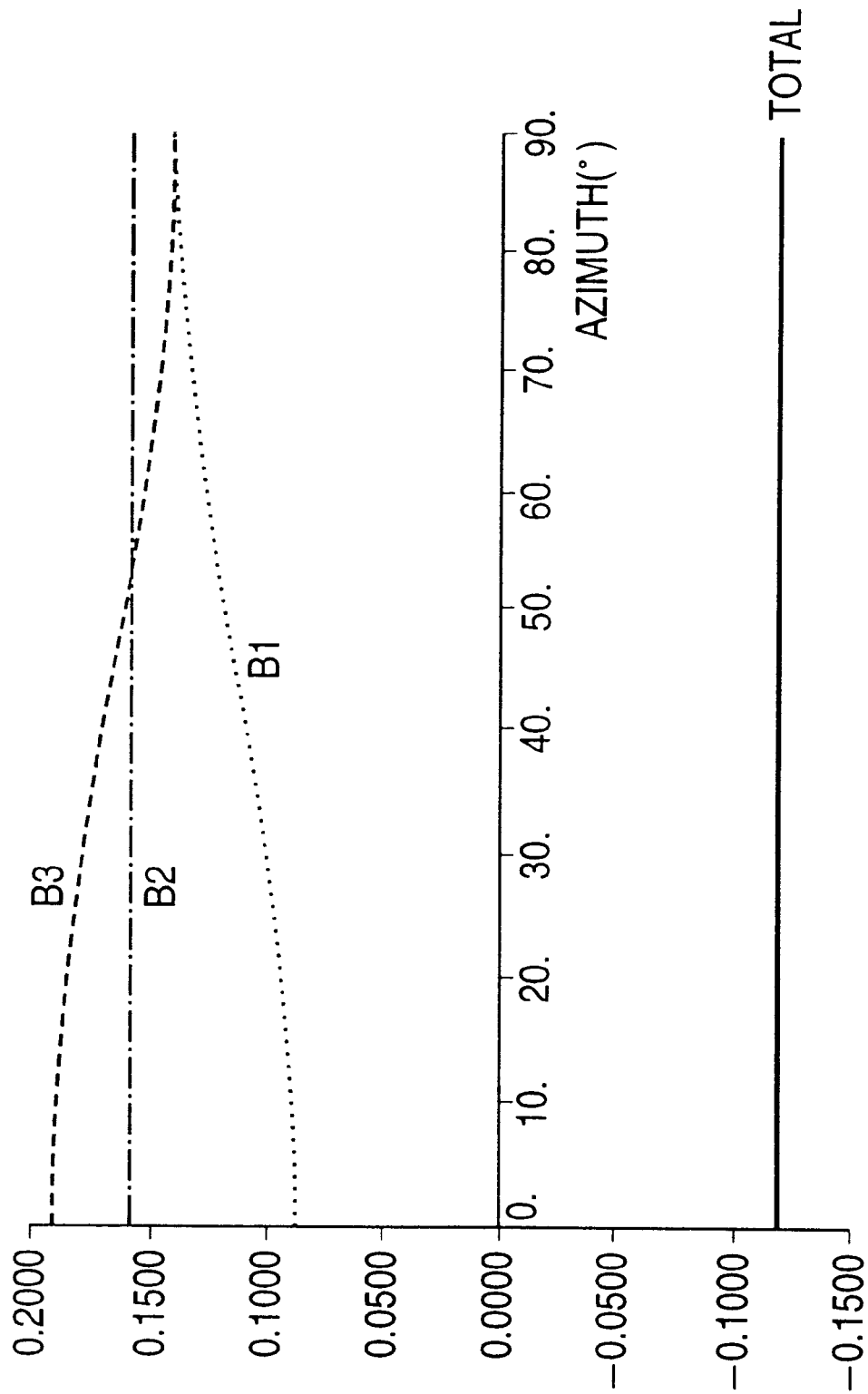
FIG. 11 shows the azimuth dependency of the powers in each lens unit and the entire system of Embodiment 3.

The azimuth dependency of the power of each lens unit and the power of the entire system is shown in FIG. 11. The azimuth dependency of the power occurs in the first lens unit B1 and the third lens unit B3, but in the entire system, the dependency is compensated for so as to become smaller.

Figure 12:
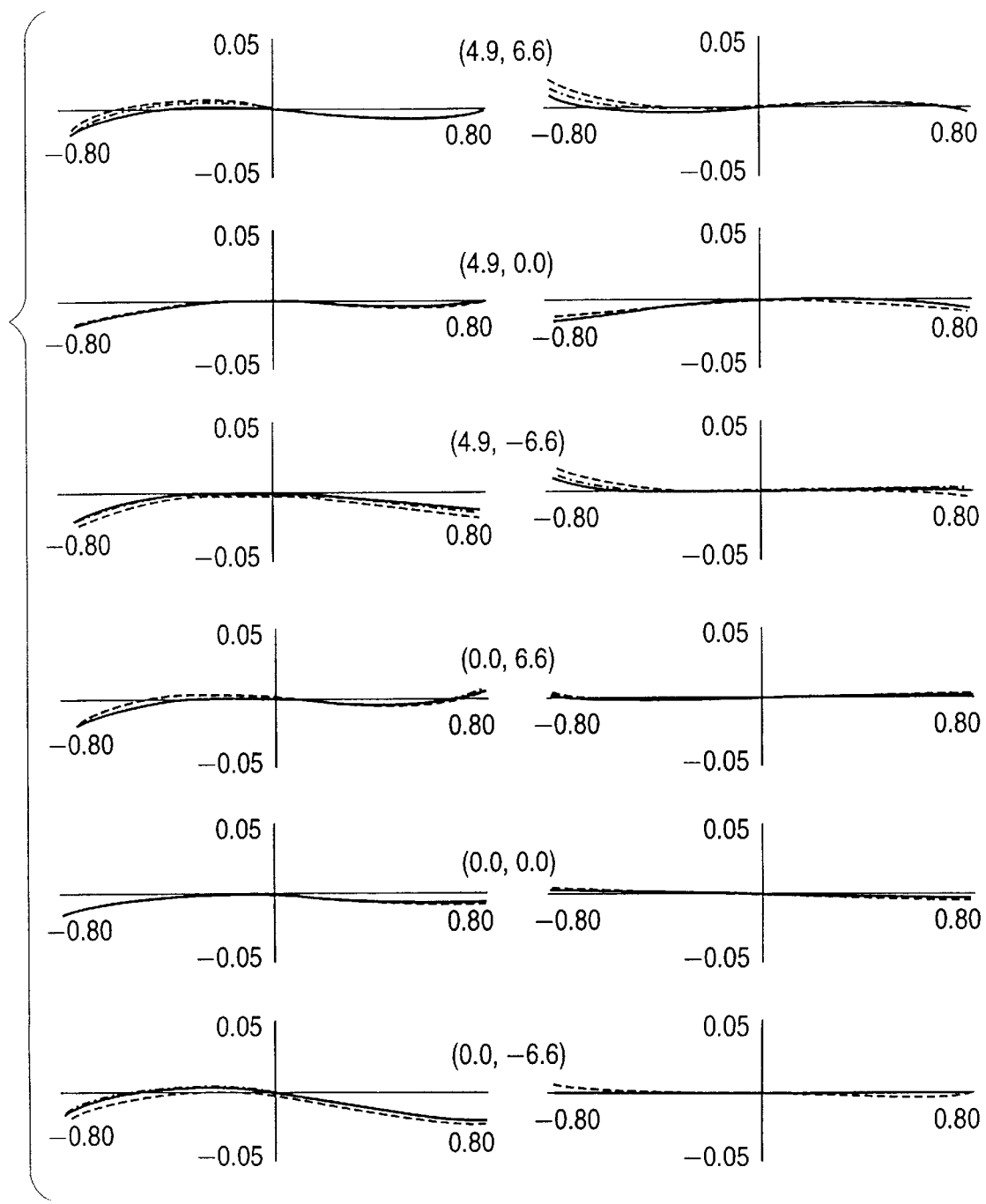
FIG. 12 shows the lateral aberration of Embodiment 3.

Also, the lateral aberration of the present embodiment is shown in FIG. 12. It is seen that the image surface positions coincide well with each other and astigmatism does not occur on the axis.

[Embodiment 4]

Figure 13:
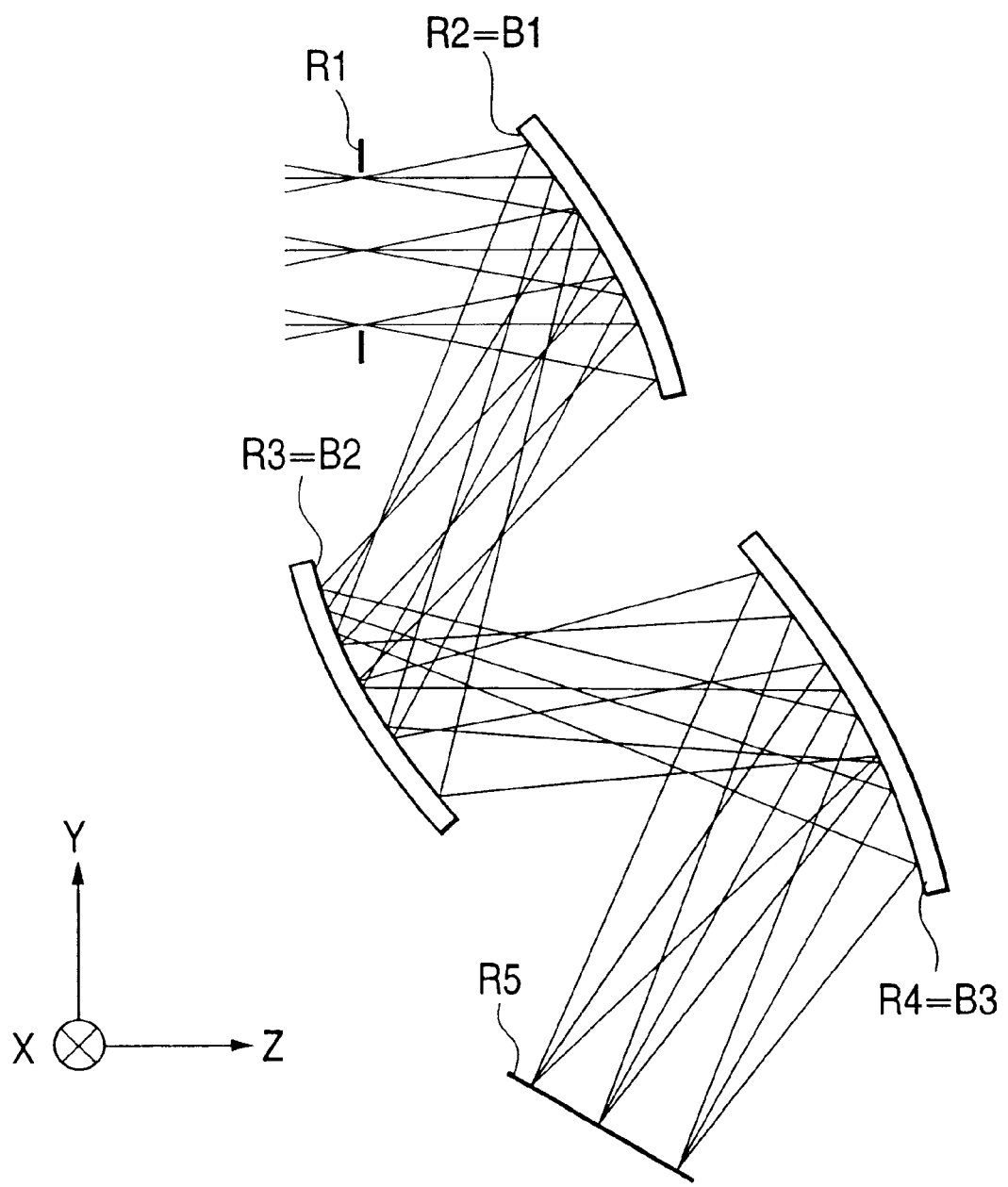
FIG. 13 is a cross-sectional view of Embodiment 4 of the optical system of the present invention.

Embodiment 4 is an optical system comprising three off-axial curved reflecting surfaces. FIG. 13 shows a cross-sectional view of the optical system. An optical path is also shown in FIG. 13.

| | | horizontal half angle of view 9.8 (deg) vertical half angle of view 7.4 (deg) diameter of the stop 3.00 | | | | |
|---|---|---|---|---|---|---|
| i | Yi | Zi | θi | Di | Ndi | vdi |
| 1 | 0.00 | 0.00 | 0.00 | 5.00 | 1 | stop |
| | | | first reflecting surface B1 | | | |
| 2 | 0.00 | 5.00 | 30.00 | 10.00 | 1 | reflecting surface |
| | | | second reflecting surface B2 | | | |
| 3 | −8.66 | −0.00 | 30.00 | 10.00 | 1 | reflecting surface |
| | | | third reflecting surface B3 | | | |
| 4 | −8.66 | 10.00 | 30.00 | 10.12 | 1 | reflecting surface |
| 5 | −17.42 | 4.94 | 60.00 | | 1 | image surface |

| | aspherical shape | | |
|---|---|---|---|
| surface R2 | $C_{02} = -3.28180e - 02$ | $C_{20} = -1.41953e - 02$ | $C_{40} = -8.49925e - 05$ |
| | $C_{03} = 1.12731e - 03$ | $C_{21} = -2.95554e - 06$ | $C_{41} = 1.99110e - 05$ |
| | $C_{04} = -1.28925e - 04$ | $C_{22} = -4.80840e - 04$ | |
| | $C_{05} = 2.36825e - 05$ | $C_{23} = 2.86282e - 05$ | |
| Surface R3 | $C_{02} = 4.32978e - 02$ | $C_{20} = 5.77367e - 02$ | $C_{40} = -4.85626e - 04$ |
| | $C_{03} = 3.01943e - 03$ | $C_{21} = 3.30204e - 04$ | $C_{41} = -2.89616e - 04$ |
| | $C_{04} = 5.01626e - 04$ | $C_{22} = 1.71546e - 03$ | |
| | $C_{05} = 7.55446e - 05$ | $C_{23} = 1.96954e - 04$ | |
| surface R4 | $C_{02} = -3.17249e - 02$ | $C_{20} = -7.18618e - 2$ | $C_{40} = -2.63245e - 04$ |
| | $C_{03} = 1.17681e - 04$ | $C_{21} = -1.50138e - 04$ | $C_{41} = 7.19347e - 05$ |
| | $C_{04} = -3.25826e - 05$ | $C_{22} = -3.87689e - 05$ | |
| | $C_{05} = 1.11479e - 05$ | $C_{23} = 1.36927e - 05$ | |

In this embodiment, the optical system is comprised of three off-axial curved reflecting surfaces R2, R3 and R4, which are the first reflecting surface (the first partial system) B1, the second reflecting surface (the second partial system) B2 and the third reflecting surface (the third partial system) B3, respectively. The first surface R1 is a stop, and the fifth surface R5 is the image surface.

The second reflecting surface B2 (=R3) in the present embodiment is a substantially isotropic surface and it has little or no azimuth dependency. The power $\phi_2$ of the second reflecting surface B2 is $\phi_2(\xi)=0.199995-0.000015 \cos(2\xi)$ and has little or no azimuth dependency. The converted interval (the converted principal point interval) $e_1$ between the first reflecting surface B1 (=R2) and the second reflecting surface B2 is 10 and the converted interval $e_2$ between the second reflecting surface B2 and the third reflecting surface B3 is 10 and therefore, the right side of expression (1) is $(e_1+e_2)/(e_1*e_2)=0.2$ and this substantially satisfies expression (1).

Further, the power of the first reflecting surface B1 and the power of the third reflecting surface B3 are $$\phi_1(\xi) = 0.100375 + 0.051205\cos(2\xi)$$

$$\phi_3(\xi) = 0.197735 - 0.051205\cos(2\xi)$$

$$(e_1/e_2)^2 = 1$$

and this satisfies expression (2).

Figure 14:
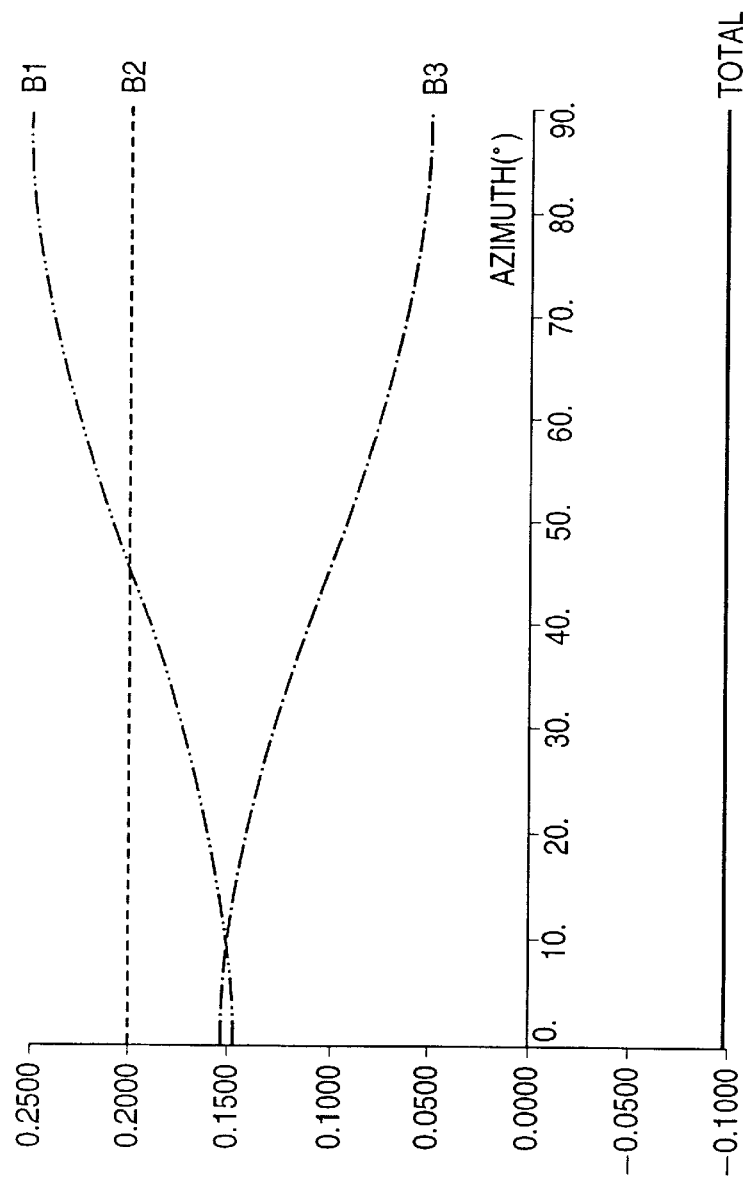
FIG. 14 shows the azimuth dependency of the powers in each surface and the entire system of Embodiment 4.

The azimuth dependency of the power of each reflecting surface and the power of the entire system is shown in FIG. 14. The azimuth dependency of the power occurs in the first reflecting surface B1 and the third reflecting surface B3, but in the entire system, the dependency is compensated for so as to become smaller.

Figure 15:
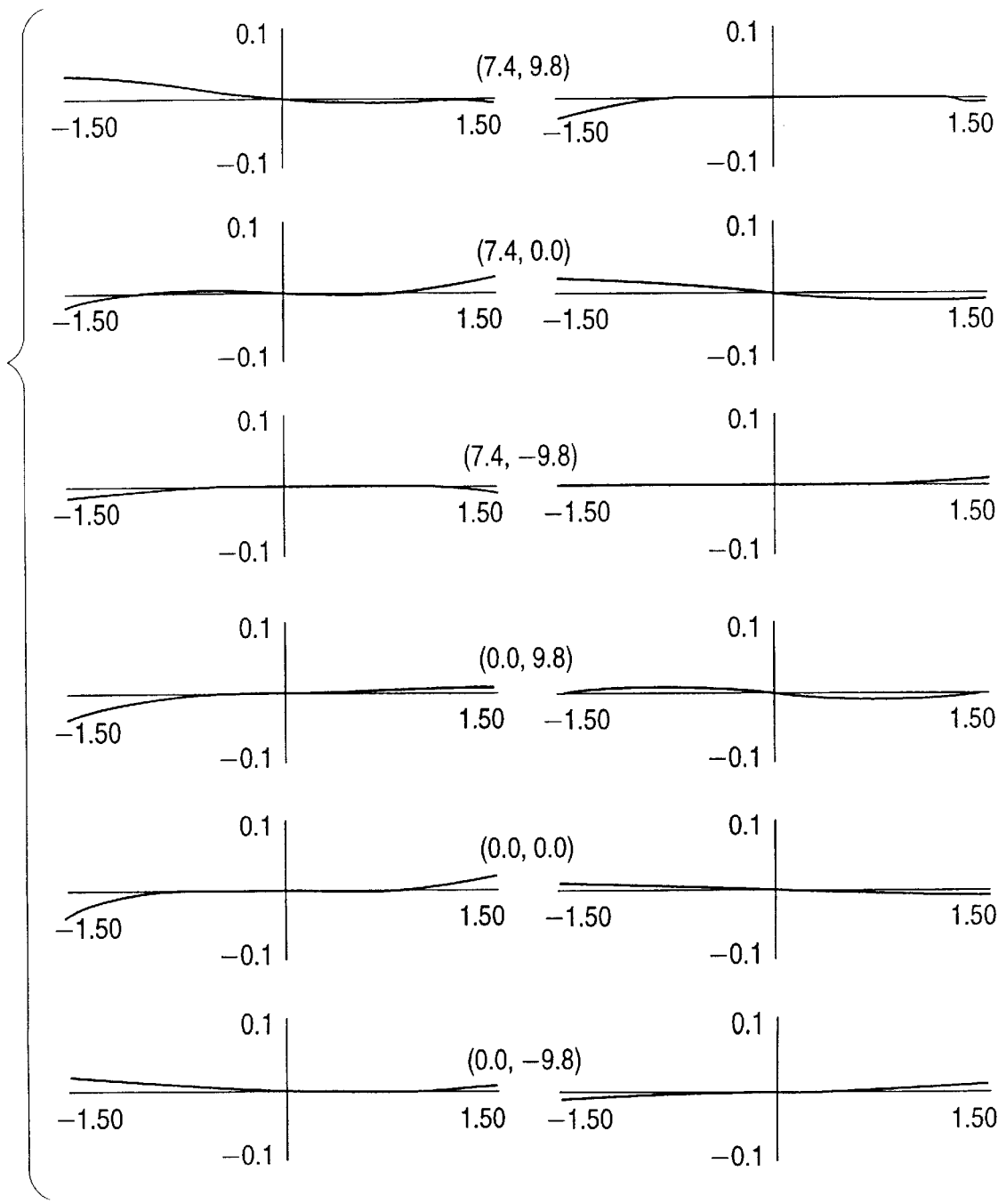
FIG. 15 shows the lateral aberration of Embodiment 4.

Also, the lateral aberration of the present embodiment is shown in FIG. 15. It is seen that the image surface positions coincide well with each other and astigmatism does not occur on the axis.

[Embodiment 5]

Figure 16:
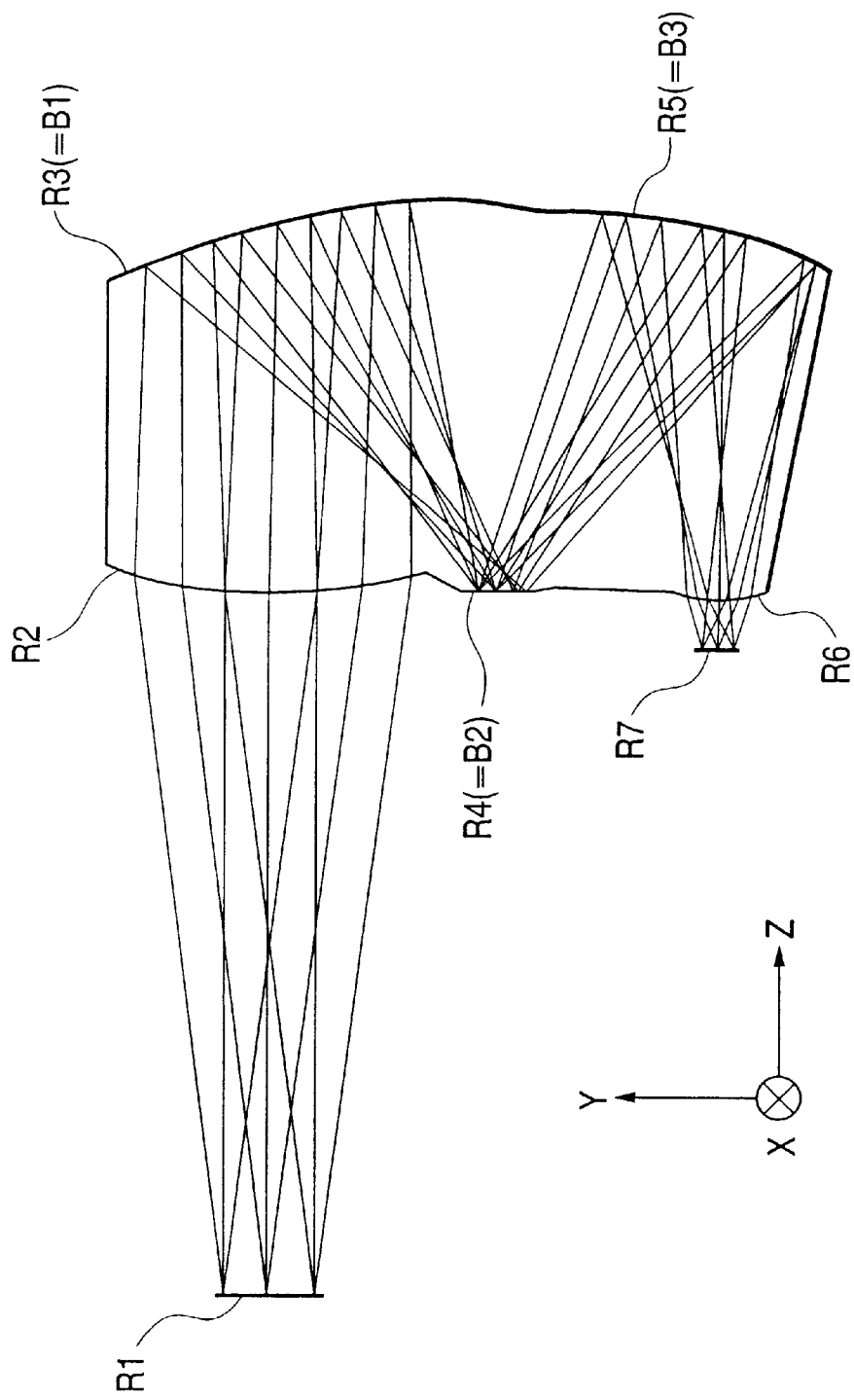
FIG. 16 is a cross-sectional view of Embodiment 5 of the optical system of the present invention.

Embodiment 5 is an optical system comprising a block provided with a plurality of off-axial curved reflecting surfaces, and forms the image of an object lying at a finite distance on the image surface. FIG. 16 shows a cross-sectional view of the optical system. An optical path is also shown in FIG. 16. The reference axis of the present embodiment is set along the route of a reference-axis ray travelling from the center of the object toward the center of curvature of the second surface R2.

| | | horizontal object height 0.8 vertical object height 0.6 object side NA 0.12 | | | | |
|---|---|---|---|---|---|---|
| i | Yi | Zi | θi | Di | Ndi | νdi |
| 1 | 0.00 | 0.00 | 0.00 | 2.00 | 1 | | object surface |
| 2 | 0.00 | 2.00 | 0.00 | 7.00 | 1.49171 | 57.40 | refracting surface |
| | | first reflecting surface B1 | | | | | |
| 3 | 0.00 | 9.00 | 15.00 | 8.00 | 1.49171 | 57.40 | reflecting surface |
| | | second reflecting surface B2 | | | | | |
| 4 | −4.00 | 2.07 | 0.00 | 8.00 | 1.49171 | 57.40 | reflecting surface |
| | | third reflecting surface B3 | | | | | |
| 5 | −8.00 | 9.00 | −15.00 | 7.00 | 1.49171 | 57.40 | reflecting surface |
| 6 | −8.00 | 2.00 | 0.00 | 0.94 | 1 | | refracting surface |
| 7 | −8.00 | 1.06 | 0.00 | | 1 | | image surface |

| spherical shape | |
|---|---|
| surface R2 | $r_2 = 8.313$ |
| surface R6 | $r_6 = 2.631$ |

| aspherical shape | | | |
|---|---|---|---|
| surface R3 | $C_{02} =$ −3.37103e − 02 | $C_{20} =$ −1.83177e − 02 | $C_{40} =$ −1.60695e − 04 |
| | $C_{03} =$ 5.85411e − 04 | $C_{21} =$ −3.47606e − 05 | |

-continued

| horizontal object height 0.8 vertical object height 0.6 object side NA 0.12 | | | |
|---|---|---|---|
| | $C_{04} =$ 8.44085e − 05 | $C_{22} =$ −1.38856e − 04 | |
| surface R4 | a = 8.00000e + 00 | b = 8.00000e + 00 | t = −3.00000e + 01 $C_{04} =$ −1.63552e − 03 |
| | $C_{03} =$ 1.15307e − 02 | $C_{21} =$ −1.18925e − 02 | |
| | $C_{04} =$ 6.08604e − 02 | $C_{22} =$ 5.96174e − 03 | |
| surface R5 | $C_{02} =$ −5.66152e − 02 | $C_{20} =$ −7.87746e − 02 | $C_{40} =$ −9.31288e − 05 |
| | $C_{03} =$ −3.29715e − 06 | $C_{21} =$ −3.56656e − 04 | |
| | $C_{04} =$ −1.49264e − 04 | $C_{22} =$ −2.42349e − 04 | |

In this embodiment, the optical system is comprised of a spherical entrance refracting surface R2 and a spherical exit refracting surface R6 and three off-axial curved reflecting surfaces R3, R4 and R5 effecting internal reflection formed on a transparent body.

The first surface R1 is the object surface, and the seventh surface R7 is the image surface. The object distance from the first surface R1 to the second surface R2 is 11.1.

Of the optical system, two refracting surfaces (R2 and R6) are spherical i.e., isotropic surfaces and therefore have no azimuth dependency. So, if the remaining three surfaces, i.e., the third surface R3, the fourth surface R4 and the fifth surface R5 are defined as the first reflecting surface (the first partial system) B1, the second reflecting surface (the second partial system) B2 and the third reflecting surface (the third partial system) B3, respectively, the second reflecting surface B2 (=R4) is an isotropic surface and has no azimuth dependency. The power $\phi_2$ of the second reflecting surface B2 (=R4) is $\phi_2 = 0.3729275$ and on the other hand, the converted interval (converted principal point interval) $e_1$ between the first reflecting surface B1 (=R3) and the second reflecting surface B2 (=R4) is 5.36297, and the converted interval $e_2$ between the second reflecting surface B2 (=R4) and the third reflecting surface B3 (=R5) is 5.36297 and therefore, the right side of expression (1) is $(e_1+e_2)/(e_1*e_2)=0.3729279$ and this substantially satisfies expression (1).

Also, the power of the first reflecting surface B1 (=R3) and the power of the third reflecting surface B3 (=R5) are $$\phi_1(\xi) = 0.156905 + 0.051335\cos(2\xi)$$

$$\phi_3(\xi) = 0.401875 - 0.052145\cos(2\xi)$$

$$(e_1/e_2)^2 = 1$$

and this substantially satisfies expression (2).

Figure 17:
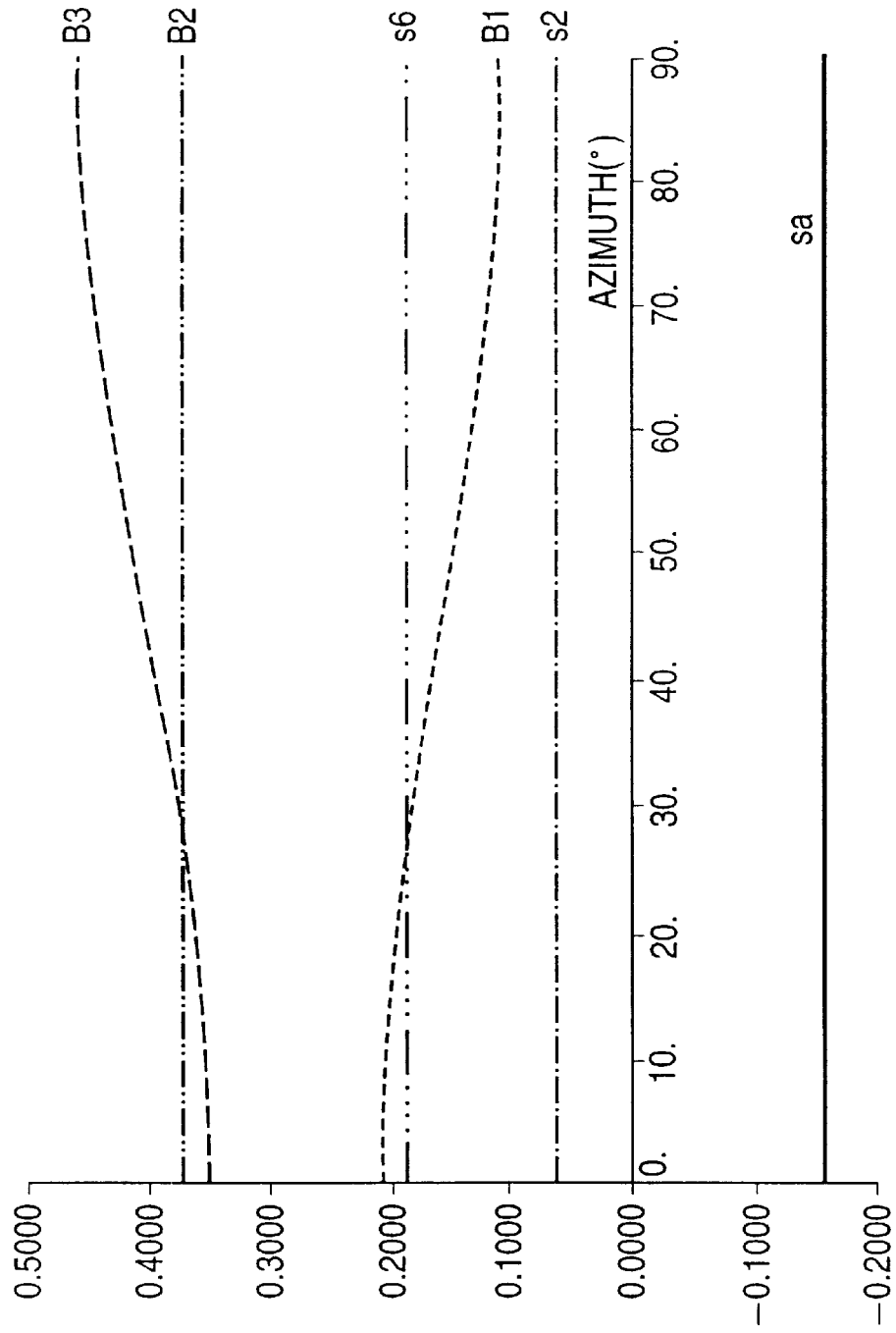
FIG. 17 shows the azimuth dependency of the powers in each surface and the entire system of Embodiment 5.

The azimuth dependency of the power of each surface and the power of the entire system is shown in FIG. 17. In the first reflecting surface B1 (=R3) and the third reflecting surface B3 (=R5), the azimuth dependency of the power occurs, but in the entire system, the dependency is compensated for so as to become smaller.

Figure 18:
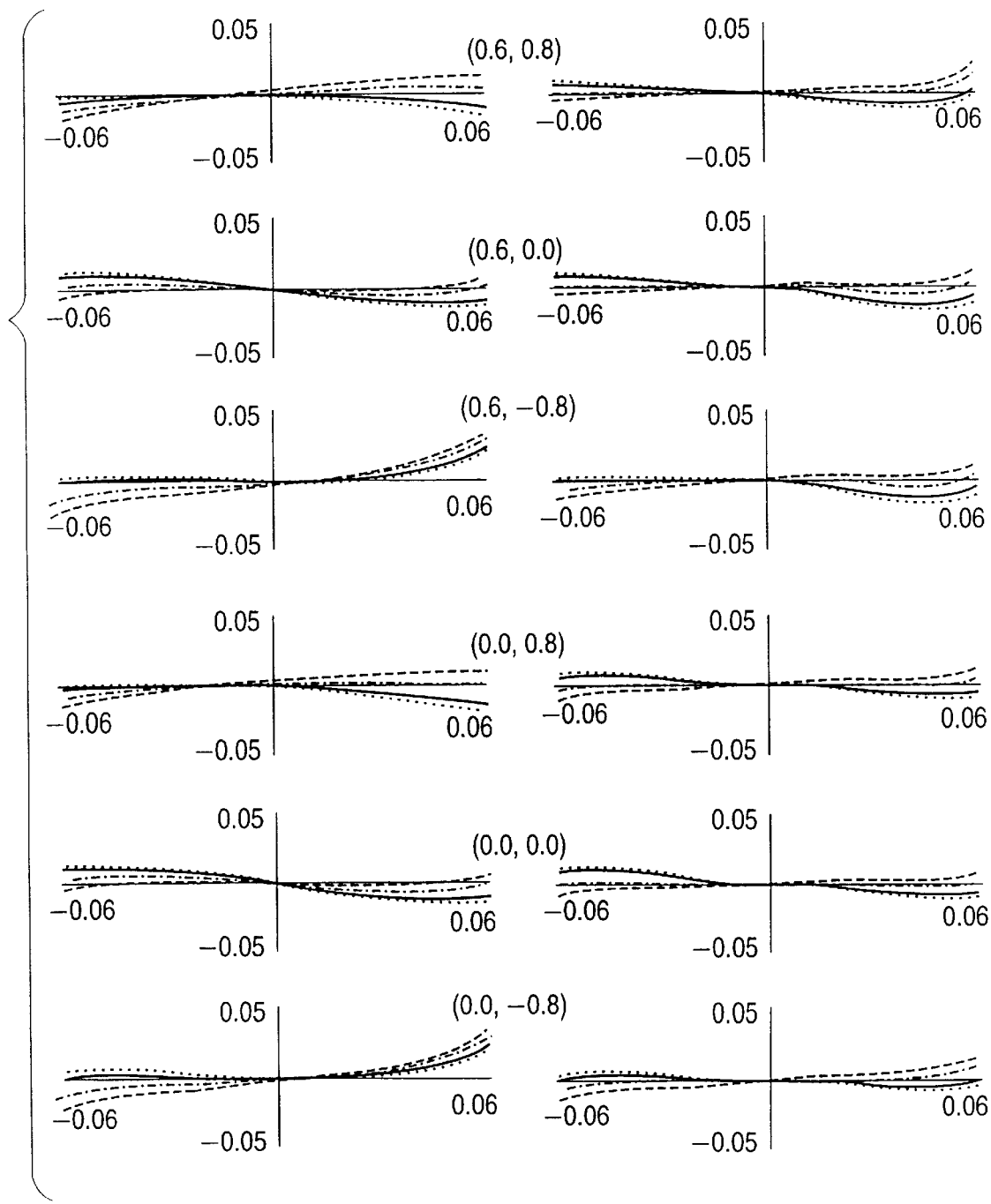
FIG. 18 shows the lateral aberration of Embodiment 5.

The lateral aberration of the present embodiment is shown in FIG. 18. It is seen that the image surface positions coincide well with each other and astigmatism does not occur on the axis.

[Embodiment 6]

Figure 19:
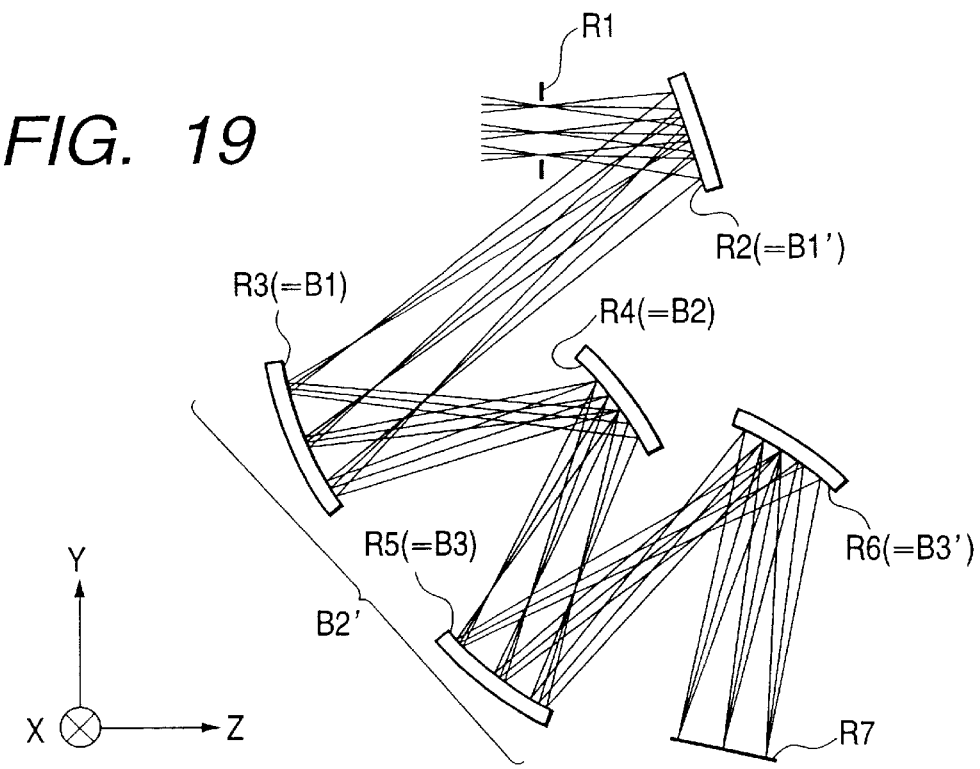
FIG. 19 is a cross-sectional view of Embodiment 6 of the optical system of the present invention.

Embodiment 6 is an optical system comprising five off-axial curved reflecting surfaces. FIG. 19 shows a cross-sectional view of the optical system. An optical path is also shown in FIG. 19.

horizontal half angle of view 6.6 (deg)
vertical half angle of view 4.9 (deg)
diameter of the stop 1.60

| i | Yi | Zi | θi | Di | Ndi | νdi |
|---|-----|-----|-----|-----|-----|-----|
| 1 | 0.00 | 0.00 | 0.00 | 5.00 | 1 | stop |
| 2 | 0.00 | 5.00 | 20.00 | 15.04 | 1 | reflecting surface |
| 3 | −10.28 | −7.26 | 25.00 | 10.00 | 1 | reflecting surface |
| 4 | −8.55 | 2.59 | 40.00 | 10.00 | 1 | reflecting surface |
| 5 | −17.95 | −0.83 | 55.00 | 11.59 | 1 | reflecting surface |
| 6 | −10.23 | 8.36 | 60.00 | 10.00 | 1 | reflecting surface |
| 7 | −20.08 | 6.63 | 80.00 | 1 | | image surface | spherical shape surface R2    $r_2 = -27.393$ aspherical shape

| surface R3 | $C_{02} =$ 3.90732e − 02 | $C_{20} =$ 3.30730e − 02 | $C_{40} = -2.25243e - 03$ |
| | $C_{03} =$ 2.03439e − 03 | $C_{21} =$ 8.22484e − 03 | |
| | $C_{04} =$ 5.35785e − 05 | $C_{22} =$ 2.67767e − 03 | |
| surface R4 | $C_{02} =$ −4.32978e − 02 | $C_{20} =$ −5.77367e − 02 | $C_{40} = -2.16606e - 04$ |
| | $C_{03} =$ −2.20639e − 04 | $C_{21} =$ 3.23236e − 03 | |
| | $C_{04} =$ −1.51530e − 04 | $C_{22} =$ −8.20103e − 04 | |
| surface R5 | $C_{02} =$ 4.43673e − 02 | $C_{20} =$ 5.63609e − 02 | $C_{40} = 6.09452e - 04$ |
| | $C_{03} =$ 2.92625e − 03 | $C_{21} =$ −7.44404e − 03 | |
| | $C_{04} =$ 5.93731e − 04 | $C_{22} =$ −1.37333e − 05 | |
| surface R6 | $C_{02} =$ −3.67375e − 02 | $C_{20} =$ −4.59107e − 02 | $C_{40} = -1.11884e - 04$ |
| | $C_{03} =$ 1.25597e − 04 | $C_{21} =$ 2.67545e − 03 | |
| | $C_{04} =$ −1.18730e − 04 | $C_{22} =$ 5.27173e − 05 | |

In this embodiment, the optical system is comprised of fine off-axial curved reflecting surfaces R2–R6. The first surface R1 is the stop, and the seventh surface R7 is the image surface.

Only the fourth surface R4 is a reflecting surface having little or no azimuth dependency, and the second surface R2, the third surface R3, the fifth surface R5 and the sixth surface R6 are surfaces having azimuth dependency.

Figure 20:
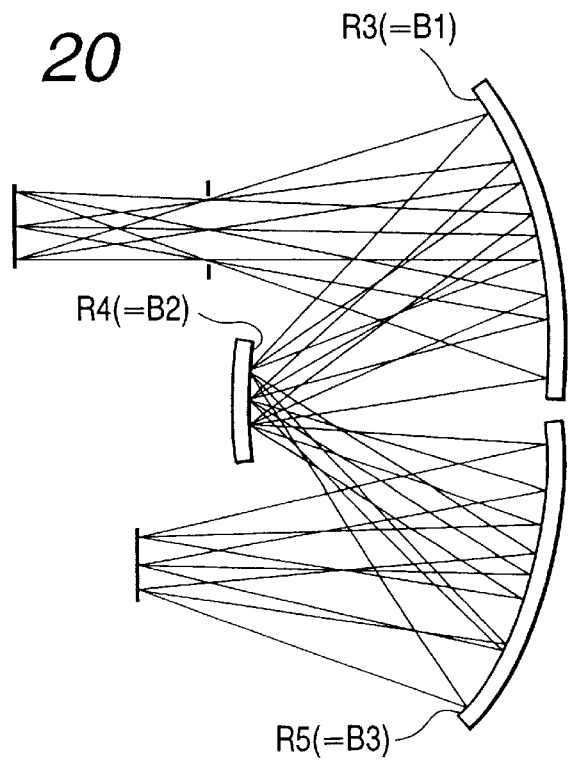
FIG. 20 is a cross-sectional view of the third surface R3 to the fifth surface R5 of Embodiment 6.

Now, defining the third surface R3 to the fifth surface R5 as the first reflecting surface B1, the second reflecting surface B2 and the third reflecting surface B3 and examining the relations among them, they are as shown in FIG. 20, and the second reflecting surface B2 (=R4) is a substantially isotropic surface and has little or no azimuth dependency. The power $\phi_{B2}$ of the second reflecting surface B2 (=R4) is $$\phi_{B2} = 0.199995 - 0.000015 \cos(2\xi).$$

On the other hand, the converted interval $e_{B1}$ between the first reflecting surface B1 (=R3) and the second reflecting surface B2 (=R4) is 10.0 and the converted interval $e_{B2}$ between the second reflecting surface B2 (=R4) and the third reflecting surface B3 (=R5) is 10.0 and therefore, the right side of expression (1) is $(e_{B1}+e_{B2})/(e_{B1}*e_{B2})=0.20$, and is substantially equal to $\phi_{B2}$, and this satisfies expression (1).

Further, the power $\phi_{B1}$ (ξ) of the first reflecting surface B1 (=R3) and the power $\phi_{B3}$ (ξ) of the third reflecting surface B3 (=R5) are $$\phi_{B1}(\xi) = 0.144795 + 0.017015\cos(2\xi)$$

$$\phi_{B3}(\xi) = 0.200745 - 0.017015\cos(2\xi)$$

$$(e_{B1}/e_{B2})^2 = 1$$

and this substantially satisfies expression (2).

Figure 21:
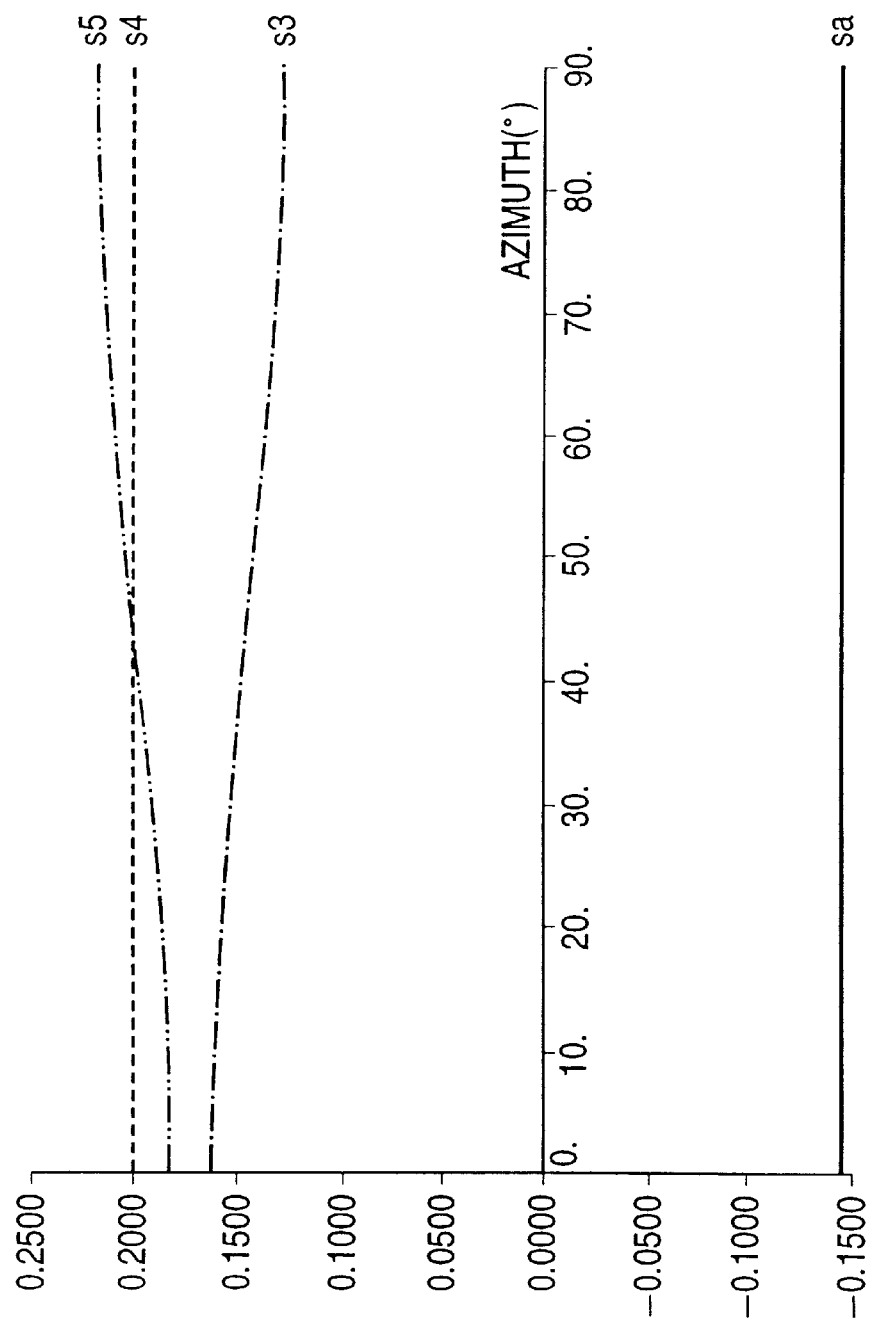
FIG. 21 shows the azimuth dependency of each of the third surface R3 to the fifth surface R5 of Embodiment 6 and composite power.

The azimuth dependency of the power of each surface and the composite power (defined as $\phi_{B2'}$) of the third surface R3 (=B1) to the fifth surface R5 (=B3) is shown in FIG. 21. In the third surface R3 (=B1) and the fifth surface R5 (=B3), the azimuth dependency of the power occurs, but in the system from the third surface R3 to the fifth surface R5, the dependency is compensated for so as to become smaller.

Next, consider the second surface R2 to the sixth surface R6 throughout. Now, the second surface is defined as the first' partial system B1', the third surface R3 to the fifth surface R5 is defined as the second' partial system B2', and the sixth surface R6 is defined as the third' partial system B3', and the azimuth dependency of each partial system is examined.

As described above, the third surface R3 to the fifth surface R5 (the second' partial system B2') is an isotropic partial system and has no azimuth dependency. The composite power $\phi_{B2'}$ of the second' partial system B2' is $$\phi_{B2'} = -0.14554.$$

On the other hand, the converted principal point interval $e_{B1'}$ between the first' partial system B1' (=R2) and the second' partial system B2' is 258 and the converted interval $e_{B2'}$ between the second' partial system B2' and the third' partial system B3' (=R6) is −1.742 and therefore, the right side of expression (1) is $$(e_{B1'}+e_{B2'})/(e_{B1'}* e_{B2'})=-0.131183$$

and is substantially equal to $\phi_{B2'}$, and this substantially satisfies expression (1).

Further, the power $\phi_{B1'}$ (ξ) of the first' partial system B1' (=R2) and the power $\phi_{B3'}$ (ξ) of the third' partial system B3' (=R6) are $$\phi_{B1'}(\xi) = 0.073155 + 0.004545\cos(2\xi)$$

$$\phi_{B3'}(\xi) = 0.164475 - 0.008095\cos(2\xi)$$

$$(e_{B1'}/e_{B2'})^2 = 1.68016$$

and this substantially satisfies expression (2).

Figure 22:
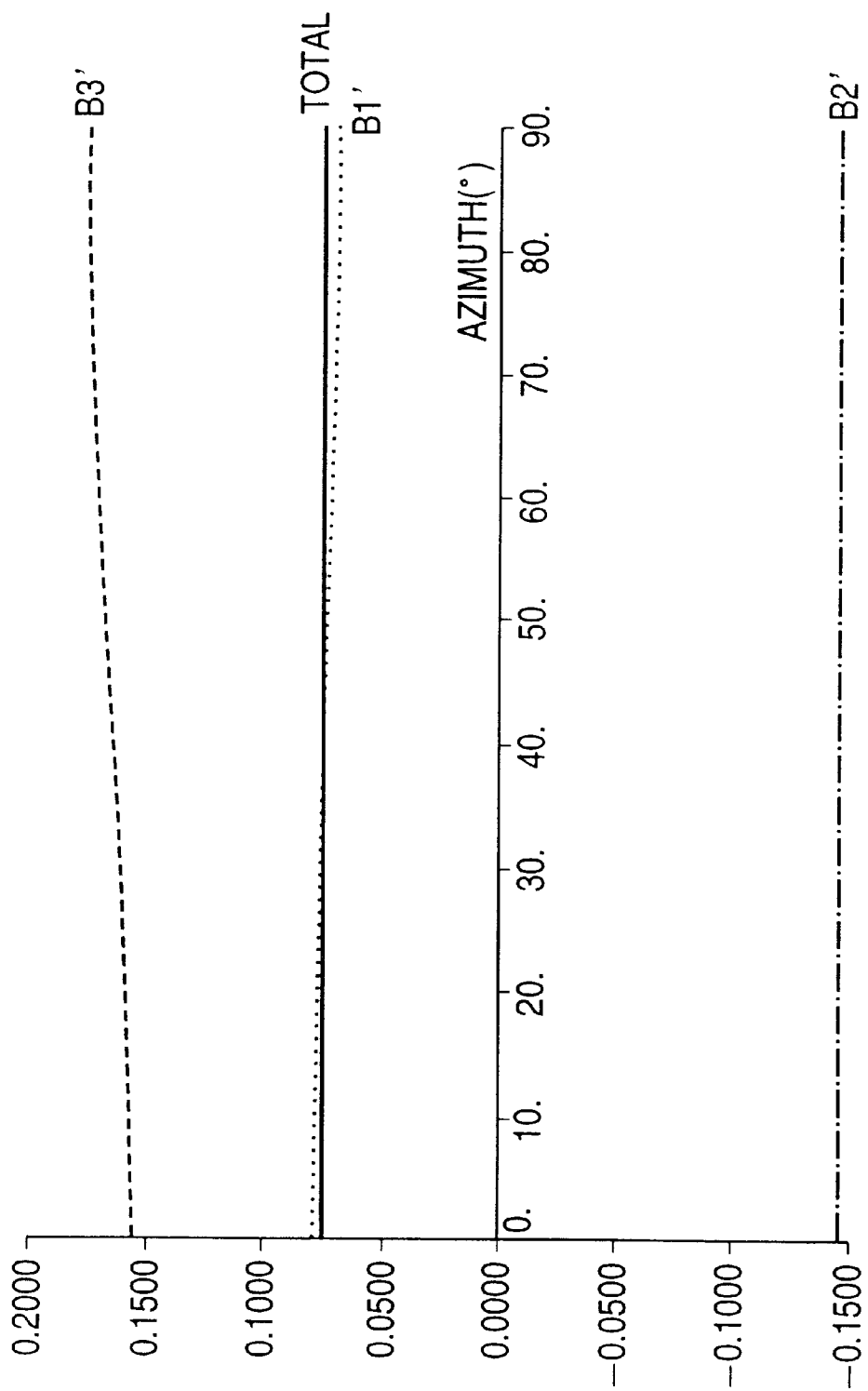
FIG. 22 shows the azimuth dependency of the powers of the second surface R2, the partial system between the third to fifth surface, the sixth surface R6 and the entire system of Embodiment 6.

The azimuth dependency of the power of each partial system and the entire system is shown in FIG. 22. In the first' partial system B1' (=R2) and the third' partial system B3' (=R6), the azimuth dependency of the power occurs, but in the entire system, the dependency is compensated for so as to become smaller.

Figure 23:
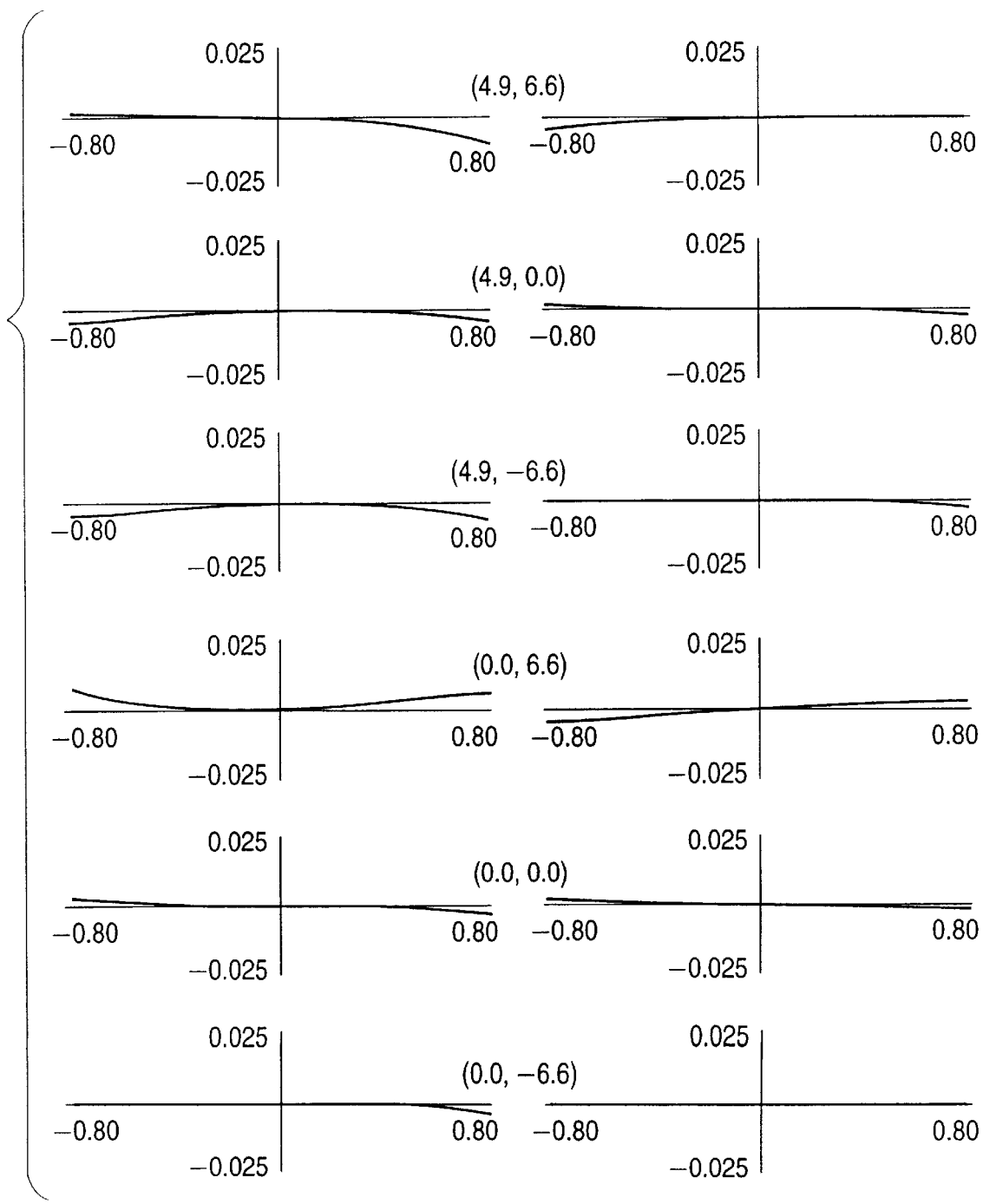
FIG. 23 shows the lateral aberration of Embodiment 6.

The lateral aberration of the present embodiment is shown in FIG. 23. It is seen that the image surface positions coincide well with each other and astigmatism does not occur on the axis.

The values of $\phi_2$, $(e_1+e_2)/(e_1 \cdot e_2)$ and the ratio $\{(e_1+e_2)/(e_1 \cdot e_2)\}/\phi_2$ in each of the above-described embodiments will be shown below.

| | $\phi_2$ | $\left(\dfrac{e_1 + e_2}{e_1 \cdot e_2}\right)$ | $\left(\dfrac{e_1 + e_2}{e_1 \cdot e_2}\right) \div \phi_2$ |
|---|---|---|---|
| Embodiment 1 | 0.042369 | 0.036996 | 0.873 |
| Embodiment 2 | 0.042210 | 0.036786 | 0.871 |
| Embodiment 3 | 0.1584 | 0.1580 | 0.997 |
| Embodiment 4 | 0.199995-α | 0.2 | 1.0 |
| Embodiment 5 | 0.3729275 | 0.3729279 | 1.000 |
| Embodiment 6 | 0.199995-α | 0.20 | 1.0 |
| | −0.14554 | −0.131183 | 0.901 |

Herein, it refers to the fact that the ratio $\{(e_1+e_2)/(e_1 \cdot e_2)\}/\phi_2$ is between 0.8 and 1.25 that $\phi_2$ is substantially equal to $(e_1+e_2)/(e_1 \cdot e_2)$.

The terms relating to $\xi$ of $\phi_3$ ($\xi$) and $[(e_1/e_2)^2 (\phi 1(\xi) - \phi 1m)]$, and ratio-$[(e_1/e_2)^2 (\phi 1(\xi) - \phi 1m)] \div (\phi 3(\xi) - \phi 3m)$ (the division of only the terms relating to $\xi$) will be shown below.

| | $\phi_3(\xi)P \equiv [(e_1/e_2)^2 (\phi 1(\xi) - \phi 1m)]$ | | |
|---|---|---|---|
| | $Q \equiv [(e_1/e_2)^2 (\phi 1(\xi) - \phi 1m) \div (\phi 3(\xi) - \phi 3(m))]$ | | |
| | $\phi_2(\xi)$ | P | Q |
| Embodiment 1 | −0.01005cos(2ξ) | −0.01178cos(2ξ) | 1.172 |
| Embodiment 2 | −0.01005cos(2ξ) | −0.01178cos(2ξ) | 1.172 |
| Embodiment 3 | 0.02464cos(2ξ) | 0.02474cos(2ξ) | 1.004 |
| Embodiment 4 | −0.051205cos(2ξ) | −0.051205cos(2ξ) | 1.000 |
| Embodiment 5 | −0.052145cos(2ξ) | −0.051335cos(2ξ) | 0.984 |
| Embodiment 6 | −0.017015cos(2ξ) | −0.017015cos(2ξ) | 1.000 |

Herein, it refers to the fact that the above-mentioned ratio $[(e_1/e_2)^2 (\phi 1(\xi) - \phi 1m)] \div (\phi 3(\xi) - \phi 3m)$ is between 0.8 and 1.25 that $\phi_3$ ($\xi$) is substantially equal to $(e_1/e_2)^2 (\phi 1(\xi) - \phi 1m)$. where, $$\phi 3m = 1/2\pi \int_0^{2\pi} \phi_3(\xi) \alpha \xi$$

The embodiments of the present invention have been described above, but even if an isotropic reflecting surface or a coaxial refracting surface is newly added to each optical system in which the above-described azimuth dependency has been compensated for, it will affect the azimuth dependency of the entire system in no way. Accordingly, it becomes possible to build an optical system further developed on the basis of the optical system of the present invention.

The present invention is also effective when use is made of the technique of disposing an anamorphic surface on the object side and varying and relaying the aspect ratio of an image when it is desired to make the dimension of the optical system in one direction thereof smaller, and restoring the aspect ratio to its original level in the anamorphic surface on this side of the image surface.

If the higher-order influence of the azimuth $\xi$ is great, it is necessary to negate cos(4ξ), cos(6ξ), . . . , but to what order the influence occurs depends on the number of the off-axial reflecting surfaces constituting a lens unit. Accordingly, it is desirable to make the numbers of the off-axial reflecting surfaces of lens units for cancelling which have the azimuth dependency equal to each other in advance.

By the above-described construction, the present invention achieves an optical system including off-axial curved surfaces in which some of a plurality of lens units (or surfaces) constituting it are designed such that the powers thereof have azimuth dependency, and design is made such that said some lens units (or surfaces) negate the azimuth dependency with one another, whereby the whole is free of the azimuth dependency of the power and first-order spherical aberration (on-axis astigmatism) is corrected.

What is claimed is:

1. An optical system in which rays of light from an object pass through a first lens unit having at least one off-axial curved surface, a second lens unit and a third lens unit having at least one off-axial curved surface in the named order, characterized in that when the route of a ray of light passing from the object through the center of a stop to the center of the last image surface is defined as a reference axis and the converted principal point interval between said first lens unit and said second lens unit is defined as e1 and the converted principal point interval between said second lens unit and said third lens unit is defined as e2 and the power of said second lens unit at a certain azimuth angle is defined as $\phi 2$ ($\xi$), the condition that $$0.8 \le |\phi 2(\xi)/\phi 2m| \le 1.25$$

where $$\phi 2m = 1/2\pi \int_0^{2\pi} \phi 2(\xi) d\xi$$

is satisfied, and when the powers of said first lens unit and said third lens unit at a certain azimuth angle are defined as $\phi 1$ ($\xi$) and $\phi 3$ ($\xi$), respectively, the conditions that $$0.80 \le (e1 + e2)/(e1 \cdot e2) \div \phi 2(\xi) \le 1.25$$

$$0.80 \le -[(e1/e2)^2(\phi 1(\xi) - \phi 1m)] \div (\phi 3(\xi) - \phi 3m) \le 1.25$$

where $$\phi 1m = 1/2\pi \int_0^{2\pi} \phi 1(\xi) d\xi$$

$$\phi 3m = 1/2\pi \int_0^{2\pi} \phi 3(\xi) d\xi$$

are satisfied.

2. An optical system having a transparent body provided with three reflecting surfaces by which rays of light from an object are internally reflected and pass, i.e., a first reflecting surface, a second reflecting surface and a third reflecting surface, characterized in that when the route of a ray of light passing from the object through the center of a stop to the center of the last image surface is defined as a reference axis and the converted interval between said first reflecting surface and said second reflecting surface is defined as e1 and the converted interval between said second reflecting surface and said third reflecting surface is defined as e2 and the power of said second reflecting surface at a certain azimuth angle is defined as $\phi 2(\xi)$, the condition that $$0.8 \leq |\phi2(\xi)/\phi2m| \leq 1.25$$

where $$\phi2m = 1/2\pi \int_0^{2\pi} \phi2(\xi)d\xi$$

is satisfied, and when the powers of said first reflecting surface and said third reflecting surface at a certain azimuth angle are defined as $\phi1(\xi)$ and $\phi3(\xi)$, respectively, the conditions that $$0.80 \leq (e1 + e2)/(e1 \cdot e2) \div \phi2(\xi) \leq 1.25$$

$$0.80 \leq -[(e1/e2)^2(\phi1(\xi) - \phi1m)] \div (\phi3(\xi) - \phi3m) \leq 1.25$$

where $$\phi1m = 1/2\pi \int_0^{2\pi} \phi1(\xi)d\xi$$

$$\phi3m = 1/2\pi \int_0^{2\pi} \phi3(\xi)d\xi$$

are satisfied.

3. An optical system having three reflecting surfaces through which rays of light from an object pass, i.e., a first reflecting surface, a second reflecting surface and a third reflecting surface, characterized in that when the route of a ray of light passing from the object through the center of a stop to the center of the last image surface is defined as a reference axis and the converted interval between said first reflecting surface and said second reflecting surface is defined as e1 and the converted interval between said second reflecting surface and said third reflecting surface is defined as e2 and the power of said second reflecting surface at a certain azimuth angle is defined as $\phi2(\xi)$, the condition that $$0.8 \leq |\phi2(\xi)/\phi2m| \leq 1.25$$

where $$\phi2m = 1/2\pi \int_0^{2\pi} \phi2(\xi)d\xi$$

is satisfied, and when the powers of said first reflecting surface and said third reflecting surface at a certain azimuth angle are defined as $\phi1(\xi)$ and $\phi3(\xi)$, respectively, the conditions that $$0.80 \leq (e1 + e2)/(e1 \cdot e2) \div \phi2(\xi) \leq 1.25$$

$$0.80 \leq -[(e1/e2)^2(\phi1(\xi) - \phi1m)] \div (\phi3(\xi) - \phi3m) \leq 1.25$$

where $$\phi1m = 1/2\pi \int_0^{2\pi} \phi1(\xi)d\xi$$

$$\phi3m = 1/2\pi \int_0^{2\pi} \phi3(\xi)d\xi$$

are satisfied.

4. An optical system comprising:

a first optical part having substantially no azimuth dependency;

a second optical part having azimuth dependency; and a third optical part having azimuth dependency, wherein the azimuth dependency of said second optical part and the azimuth dependency of said third optical part cancel each other so as to have substantially no azimuth dependency in combination of said first optical part, said second optical part and said third optical part.

5. An optical system according claim 4, wherein the following condition is satisfied, $$0.8 \leq |\phi2(\xi)/\phi2m| \leq 1.25$$

where $\phi2(\xi)$ represents an optical power of said first optical part at a certain azimuth angle $\xi$, and $$\phi2m = 1/(2\pi) \int_0^{2\pi} \phi2(\xi)d\xi.$$

6. An optical system according to claim 4, wherein said second optical part, said first optical part and said third optical part are disclosed in order from an object side.

7. An optical system according to claim 4, wherein said second optical part and said third optical part have off-axial curved surfaces.

* * * * *

UNITED STATES PATENT AND TRADEMARK OFFICE
CERTIFICATE OF CORRECTION

PATENT NO.     : 6,204,978 B1
DATED          : March 20, 2001
INVENTOR(S)    : Takeshi Akiyama et al.

It is certified that error appears in the above-identified patent and that said Letters Patent is hereby corrected as shown below:

Column 1,
Line 53, "some" should read -- same --.

Column 9,
Numerical expression 10, "+ (cosθ'sinξcosξ" should read -- + (cosθ'sinξcosξ --.

Column 11,
Line 21, "anamorphic" should read -- an amorphic --.

Column 16,
Lines 25 and 62, "yz" should read -- YZ --.
Line 28, "xz" should read -- XZ --.
Line 38, "us" should read -- $u_y$ --.
Line 40, "u." should read -- $u_x$ --.

Column 30,
Line 54, "$(e_{B1'}/e_{B2'})^2$" should read -- $(e_{B1'}/e_{B3'})^2$ --.

Column 31,
Line 20, "φ1m]," should read -- φ1m)] --.
Line 37, "where," should be deleted.
Line 40, φ3m" should read -- where, φ3m --.

Column 32,
Line 33, "$\phi 2m = 1/2\pi \int_0^{2\pi} \phi 2(\xi)d\xi$" should read -- $\phi 2m = 1/(2\pi) \int_0^{2\pi} \phi 2(\xi)d\xi$ --.

Column 33,
Line 5, "$\phi 2m = 1/2\pi \int_0^{2\pi} \phi 2(\xi)d\xi$" should read -- $\phi 2m = 1/(2\pi) \int_0^{2\pi} \phi 2(\xi)d\xi$ --.

Line 19, "$\phi 1m = 1/2\pi \int_0^{2\pi} \phi 1(\xi)d\xi$" should read -- $\phi 1m = 1/(2\pi) \int_0^{2\pi} \phi 1(\xi)d\xi$ --.

Line 21, "$\phi 3m = 1/2\pi \int_0^{2\pi} \phi 3(\xi)d\xi$" should read -- $\phi 3m = 1/(2\pi) \int_0^{2\pi} \phi 3(\xi)d\xi$ --.

Line 40, "$\phi 2m = 1/2\pi \int_0^{2\pi} \phi 2(\xi)d\xi$" should read -- $\phi 2m = 1/(2\pi) \int_0^{2\pi} \phi 2(\xi)d\xi$ --.

UNITED STATES PATENT AND TRADEMARK OFFICE
CERTIFICATE OF CORRECTION

PATENT NO. : 6,204,978 B1
DATED : March 20, 2001
INVENTOR(S) : Takeshi Akiyama et al.

It is certified that error appears in the above-identified patent and that said Letters Patent is hereby corrected as shown below:

Column 34,

Line 9, "$\phi 1m = 1/2\pi \int_0^{2\pi} \phi 1(\xi)d\xi$" should read -- $\phi 1m = 1/(2\pi) \int_0^{2\pi} \phi 1(\xi)d\xi$ --.

Line 11, "$\phi 3m = 1/2\pi \int_0^{2\pi} \phi 3(\xi)d\xi$" should read -- $\phi 3m = 1/(2\pi) \int_0^{2\pi} \phi 3(\xi)d\xi$ --.

Line 32, "an" should read -- the --.

Signed and Sealed this

Second Day of April, 2002

Attest:

JAMES E. ROGAN
Attesting Officer     Director of the United States Patent and Trademark Office